(12) United States Patent
Komura et al.

(10) Patent No.: US 8,270,791 B2
(45) Date of Patent: Sep. 18, 2012

(54) OPTICAL WAVEGUIDE AND THERMALLY-ASSISTED MAGNETIC RECORDING HEAD THEREWITH

(75) Inventors: Eiji Komura, Tokyo (JP); Tsutomu Chou, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 12/898,063

(22) Filed: Oct. 5, 2010

(65) Prior Publication Data

US 2012/0082016 A1 Apr. 5, 2012

(51) Int. Cl.
*G11B 7/135* (2006.01)
*G02B 6/34* (2006.01)
*G02B 6/42* (2006.01)

(52) U.S. Cl. .................. 385/37; 385/43; 369/44.12
(58) Field of Classification Search .............. None
See application file for complete search history.

(56) References Cited

U.S. PATENT DOCUMENTS

| | | | |
|---|---|---|---|
| 6,101,210 A * | 8/2000 | Bestwick et al. ........ | 372/96 |
| 6,768,556 B1 | 7/2004 | Matsumoto | |
| 6,944,112 B2 | 9/2005 | Challener | |
| 2003/0066944 A1 | 4/2003 | Matsumoto | |
| 2004/0081031 A1 | 4/2004 | Saga | |
| 2005/0249451 A1 | 11/2005 | Baehr-Jones | |
| 2008/0204916 A1* | 8/2008 | Matsumoto et al. ........ | 360/59 |
| 2009/0290837 A1* | 11/2009 | Chen et al. ........... | 385/37 |
| 2010/0074063 A1* | 3/2010 | Peng et al. ............ | 369/13.32 |
| 2010/0092128 A1* | 4/2010 | Okayama ............. | 385/14 |
| 2010/0103553 A1 | 4/2010 | Shimazawa | |
| 2011/0133063 A1* | 6/2011 | Ji et al. ............... | 250/227.24 |

FOREIGN PATENT DOCUMENTS

| | | |
|---|---|---|
| JP | A-2008-010093 | 1/2008 |
| JP | A-2008-016096 | 1/2008 |

OTHER PUBLICATIONS

W. Challener, "Heat-assisted magnetic recording by a near-field transducer with efficient optical energy transfer," *Nature Photonics*, pp. 1-5 (Mar. 2009).
M. Hochberg, et al., "Integrated plasmon and dielectric waveguides," *Optics Express* vol. 12, No. 22, pp. 5481-5486 (2004).

* cited by examiner

*Primary Examiner* — Hemang Sanghavi
(74) *Attorney, Agent, or Firm* — Posz Law Group, PLC

(57) ABSTRACT

An optical waveguide of the invention includes a core that is a waveguide through which light propagates; and a cladding that surrounds the core. The core has a plate shape and includes a wide core base part onto which the light is incident, a taper part that is connected to the core base part and of which a width is gradually tapered along a propagation direction, and a narrow front end core part that is connected to the taper part and that extends along the propagation direction. A grating is provided on one of planar surfaces of the wide core base part, the grating is formed by engraving a number of concave grooves having a rectangular cross section on the planar surface along a width direction thereof, the grating is formed to be optically coupled with laser light that is incident perpendicularly onto the grating formation surface, a frequency (grating pitch: pitch of the concave grooves) of the grating is smaller than a wavelength (defined as a wavelength in the cladding) of the perpendicularly incident laser light, and a groove depth H1 of the grating is formed with respect to a thickness H2 of the core base part so that a relationship H1=(0.33 to 0.67)×H2 is satisfied.

3 Claims, 15 Drawing Sheets

OPTICAL WAVEGUIDE AND THERMALLY-ASSISTED MAGNETIC RECORDING HEAD THEREWITH

BACKGROUND

The present invention relates to an optical waveguide and a thermally-assisted magnetic recording head with the optical waveguide.

In the field of magnetic recording using a head and a medium, further improvements have been demanded in performance of thin film magnetic heads and magnetic recording media in view of an increase in recording density of magnetic disk devices. For the thin film magnetic heads, composite type thin film magnetic heads formed by lamination of a reading magnetoresistive (MR) element and a writing electromagnetic conversion element are being widely used.

In contrast, the magnetic recording medium is a so-called non-continuous medium, in which magnetic particles are aggregated. Each magnetic particle has a single magnetic domain. Here, a single recording bit is formed by a plurality of magnetic particles. Therefore, to increase magnetic density, the size of the magnetic particles must be reduced, and asperity at a border of recording bits needs to be minimized. However, if the size of the magnetic particles is reduced, there is a problem that thermal stability for magnetization of the magnetic particles is lowered as the volume of the magnetic particles is reduced.

To address this problem, increasing magnetic anisotropic energy Ku of magnetic particles may be considered. However, this increase in Ku causes an increase in anisotropic magnetic field (coercive force) of the magnetic recording medium. On the other hand, the upper limit of the writing magnetic field intensity for the thin film magnetic head is determined substantially by a saturation magnetic flux density of a soft magnetic material forming a magnetic core in the head. As a result, when the anisotropic magnetic field of the magnetic recording medium exceeds an acceptable value determined from the upper value of the writing magnetic field intensity, writing becomes impossible. Currently, as a method to solve such a problem of thermal stability, a so-called thermally-assisted magnetic recording method has been proposed, which uses a magnetic material with a large Ku, which also performs the writing by heating the magnetic recording medium immediately before applying the writing magnetic field to reduce the anisotropic magnetic field.

For this thermally-assisted magnetic recording method, a method that uses a near-field probe, a so-called plasmon antenna, is known. The near-field probe is a piece of metal that generates near-field light from plasmon excited by irradiated laser light. For example, a plasmon generator that includes a metal scatterer having a shape of a cone or the like formed on a substrate is disclosed in U.S. Pat. No. 6,768,556.

In addition, a configuration is disclosed in U.S. Patent Publication No. 2004/081031 A1, in which a plasmon generator is formed at a position to contact the main magnetic pole of a perpendicular magnetic recording head so that an irradiated surface of the plasmon generator is perpendicular to the magnetic recording medium. Moreover, U.S. Patent Publication No. 2003/066944 A1 discloses a technology, in which irradiation of stronger near-field light onto the magnetic recording medium is attempted by preferentially positioning the front end of a plasmon antenna close to the magnetic recording medium.

The inventors of the present application have considered the potentiality of the magnetic recording by irradiation of the near-field light to be a breaking point and have been developing more improved thermally-assisted magnetic recording heads.

For performing the thermally-assisted recording by the irradiation of the near-field light with a magnetic recording head, it is necessary to install a laser light generating device, which is a light emitting element, in the magnetic recording head, to take in laser light emitted from the laser light generating device into an optical waveguide, and to guide the laser light to a plasmon antenna located near a position opposing the magnetic recording medium.

There are techniques for taking in the laser light emitted from the laser light generating device by providing a grating on a plane on one side of the optical waveguide and for optically coupling the laser light with the optical waveguide through the grating and subsequently for letting the laser light propagate in the optical waveguide (e.g., U.S. Pat. No. 6,944, 112 and Nature Photonics (Seagate) Mar. 22, 2009).

The technique disclosed in U.S. Pat. No. 6,944,112 irradiates the laser light emitted from the laser light generating device not perpendicularly, but diagonally, to a diffraction grating formed on a planar waveguide. In addition, the external shape of the planar waveguide is a parabolic shape, which is different from a shape of a spot size converter that focuses the laser light in a single mode. According to the technique disclosed in U.S. Pat. No. 6,944,112, the light that has propagated is once reflected in a part of the parabolic shape and is collected at the focal point.

Moreover, the technique disclosed in Nature Photonics (Seagate) is similar to U.S. Pat. No. 6,944,112. The external shape of the planar waveguide is a parabolic shape and is not a shape of a spot size converter that focuses the laser light in a single mode. Therefore, the laser light is once reflected in a part of the parabolic shape and is collected at the focal point. Further, in this document, the planar waveguide includes a dual offset grating, in which two gratings are arranged in parallel with each other. As a result, because the laser light reflected in parts of the parabolic shape intersects with each other at the focal point, final polarization (oscillation) of light is in the same up-down direction as presented on a sheet. Therefore, there is a problem that the laser light is not efficiently coupled with an element that uses the surface plasmon, on which the light propagates towards an air bearing surface (ABS).

An object of the present invention is to provide a configuration in which the laser light is reliably optically coupled with the optical waveguide by the laser light incident perpendicularly onto the optical waveguide, and an optical waveguide through which the laser light is subject to propagate in a target direction. To achieve the object, a positional relationship between the optical waveguide and the laser light generating device is simplified so that the laser light generating device is easily installed.

SUMMARY

In order to achieve the above object, an optical waveguide of the present invention in includes a core that is a waveguide through which light propagates, and a cladding that surrounds the core. A refractive index of a material forming the core is higher than a refractive index of a material forming the cladding. The core has a plate shape and includes a wide core base part onto which the light is incident, a taper part that is connected to the core base part and of which a width is gradually tapered along a propagation direction, and a narrow front end core part that is connected to the taper part and that extends along the propagation direction. A grating is provided on one of planar surfaces of the wide core base part, the grating is formed by engraving a number of concave grooves having a rectangular cross section on the planar surface along a width direction thereof, the grating is formed to be optically coupled with laser light that is incident perpendicularly onto the grating formation surface, a frequency (grating pitch: pitch of the concave grooves) of the grating is smaller than a wavelength (defined as a wavelength in the cladding) of the perpendicularly incident laser light, and a groove depth H1 of the grating is formed with respect to a thickness H2 of the core base part so that a relationship H1=(0.33 to 0.67)×H2 is satisfied.

In a preferred embodiment of the present invention, a reflective film is formed to be provided on an end surface (rear end part) of the core base part, which is on the opposite side from the propagation direction.

In a preferred embodiment of the present invention, the narrow front end core part is formed to extend along the propagation direction with substantially the same width as a final tapered width of the taper part.

In a preferred embodiment of the present invention, the grating is formed as a single grating.

In a preferred embodiment of the present invention, the grating is formed by engraving the concave grooves on the core planar surface and by filling the concave grooves with the material of the cladding therein.

In a preferred embodiment of the present invention, a width W1 of the wide core base part is formed within 0.4-10.0 μm, and a width W3 of the narrow front end core part is formed within 0.3-1.0 μm.

A thermally-assisted magnetic recording head of the present invention includes a magnetic pole that generates a writing magnetic field from an end surface thereof on a medium opposing surface side; the optical waveguide of claim 1 through which the light for exciting plasmon propagates; and a plasmon generator that is coupled with the light in a plasmon mode.

According to the present invention, by the laser light being incident perpendicularly onto the optical waveguide, the laser light is reliably optically coupled with the optical waveguide. In addition, the laser light propagates in a targeted direction. As a result, the positional relationship between the optical waveguide and the laser light generating device is simplified, and the laser light generating device can be easily installed.

DETAILED DESCRIPTION OF THE INVENTION

The best mode of the optical waveguide for implementing the present invention is described below.

Figure 1:
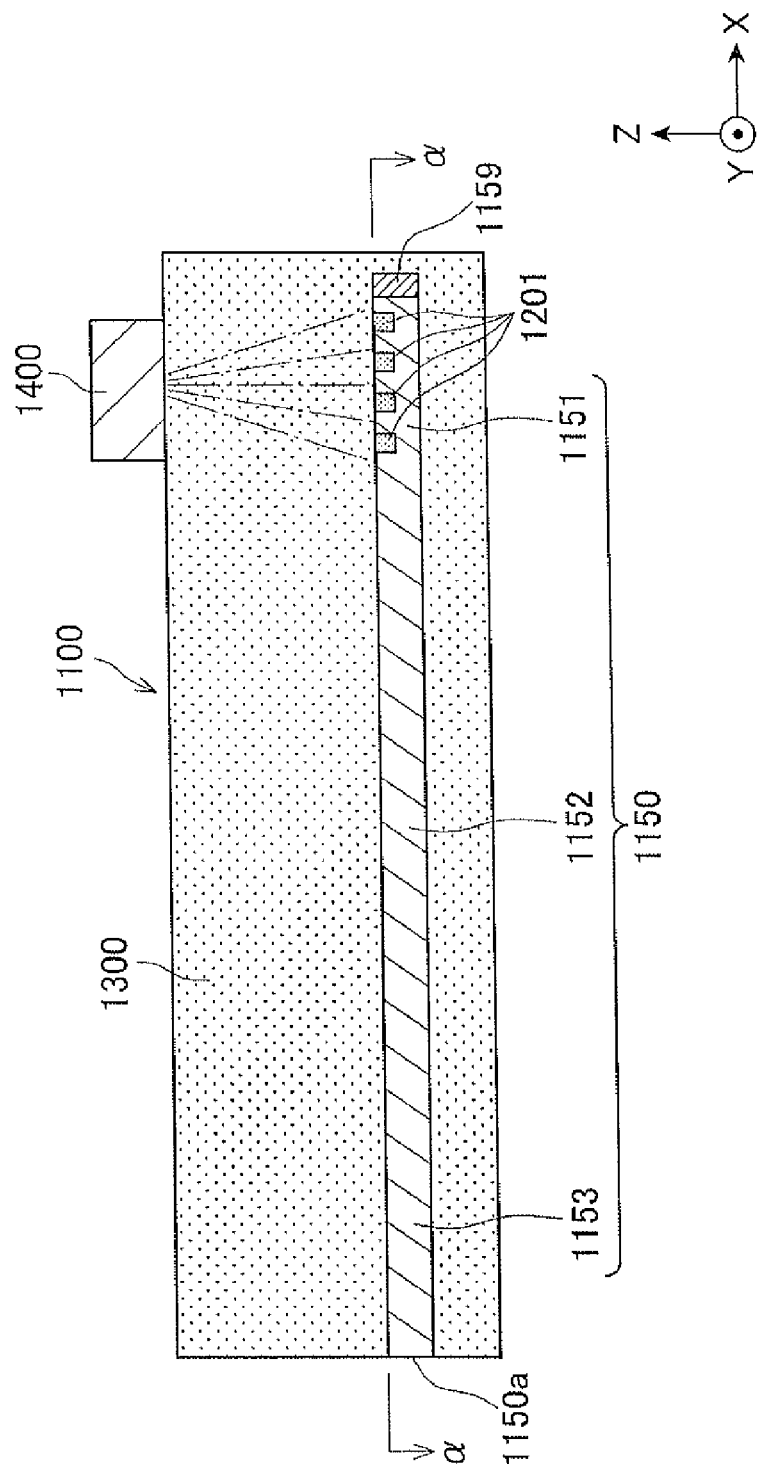
FIG. 1 illustrates a schematic cross-sectional view of an optical waveguide of the present invention, to which laser light emitted from a light emitting element is irradiated.
Figure 2:
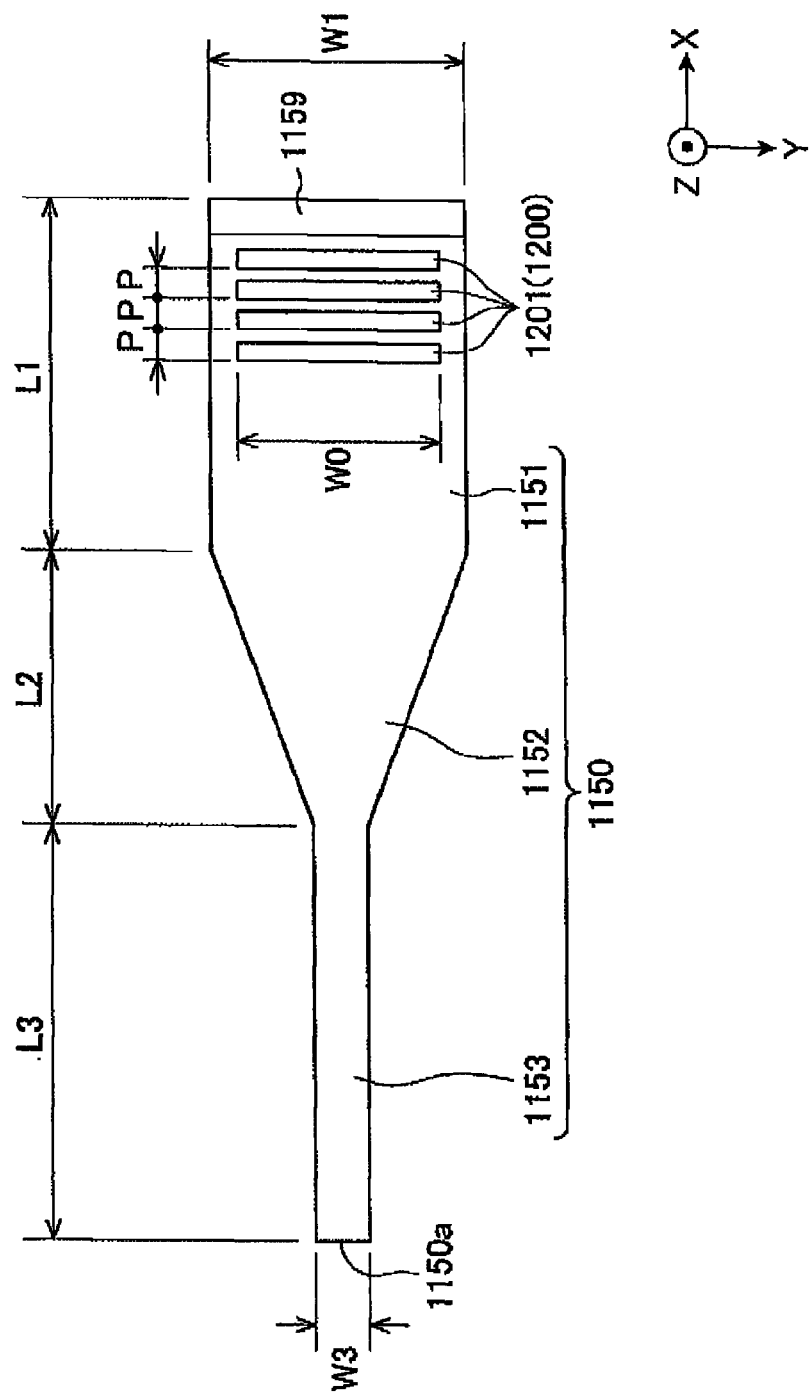
FIG. 2 is a cross-sectional view from the α-α line in FIG. 1 of the optical waveguide of the present invention and is a cross-sectional view without illustrating the cladding.
Figure 3:
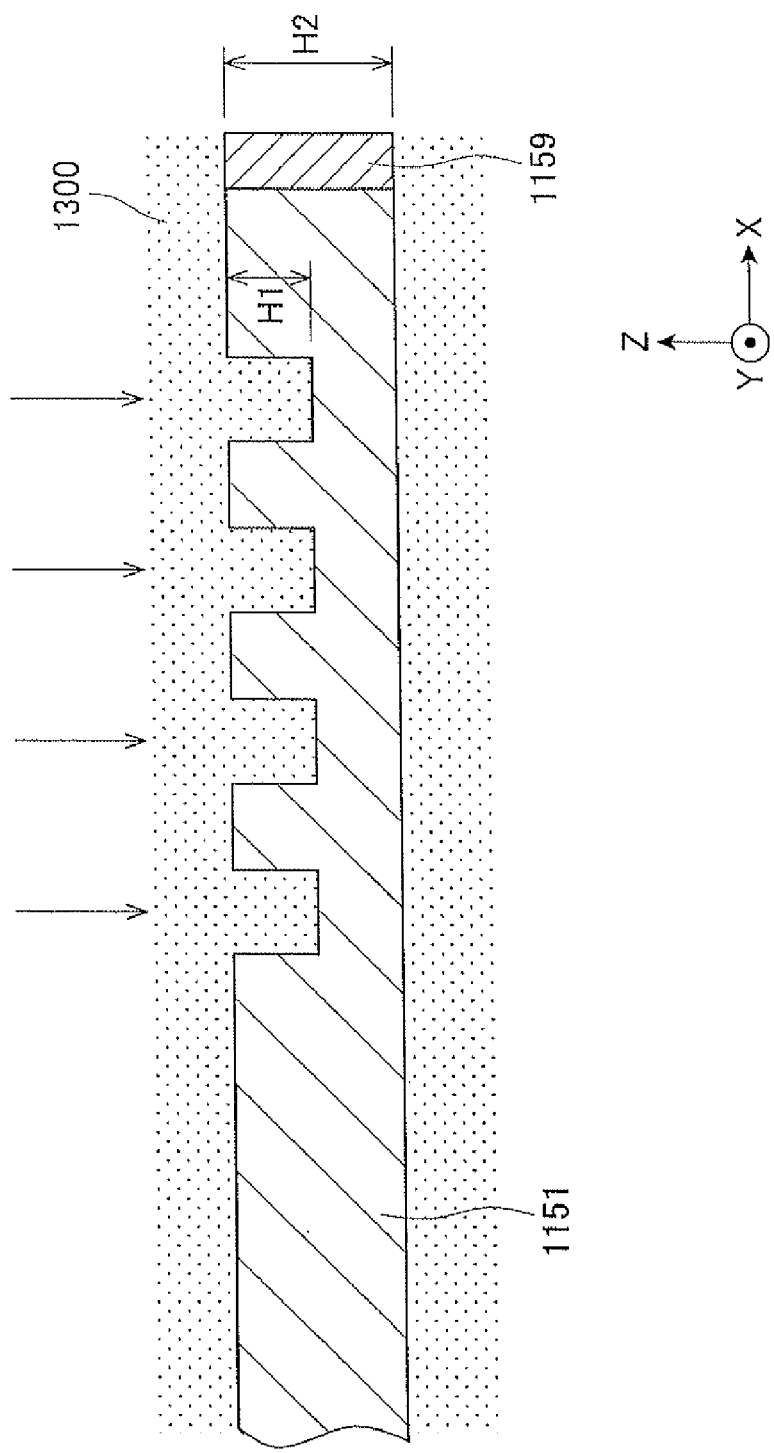
FIG. 3 is an enlarged cross-sectional view of a main part of the optical waveguide shown in FIG. 1 and is an enlarged cross-sectional view of a part of the optical waveguide where the laser light is incident perpendicularly onto a grating formation surface of a core.

FIG. 1 illustrates a schematic cross-sectional view of an optical waveguide of the present invention, to which laser light emitted from a light emitting element is irradiated. FIG. 2 is a cross-sectional view from the α-α line in FIG. 1 of the optical waveguide of the present invention and is a cross-sectional view without illustration of the cladding. FIG. 3 is an enlarged cross-sectional view of a main part of the optical waveguide shown in FIG. 1 and is an enlarged cross-sectional view of a part of the optical waveguide where the laser light is incident perpendicularly onto a grating formation surface of a core.

As shown in FIG. 1, an optical waveguide 1100 of the present invention includes a core 1150 that is a waveguide main body that forms a central part for guiding the light, and a cladding 1300 that surrounds the core 1150. Materials for the core and cladding are selected so that the refractive index of the material forming the core 1150 is higher than the refractive index of the material forming the cladding 1300.

As shown in FIGS. 1 and 2, the core 1150 has a plate shape and includes a wire core base part 1151 into which the light enters, a taper part 1152 which is connected to the core base part 1151 and of which a width gradually tapers down in the propagation direction (−X direction in FIGS. 1 and 2), and a narrow front end core part 1153 that is connected to the taper part 1152 and that extends in the propagation direction (−X direction).

Light conversion to a single mode is mainly performed at the taper part 1152, and a light propagation in the single mode is mainly performed at the narrow front end core part 1153. The single mode means that there is one path (mode) through which the light propagates. A transverse electric-transverse magnetic (TE-TM) mode conversion element, for example, may be provided in the middle of the narrow front end core part 1153 to convert the oscillation direction of the light in a desired direction. As a result, the polarization having the oscillation direction in the Y direction shown in FIG. 2 can be converted to the polarization having the oscillation direction in the Z direction.

In FIG. 2, the width W1 of the wide core base part 1151 is approximately 0.4-10.0 μm, and the width W3 of the narrow front end core part is approximately 0.3-1.0 μm. The narrow front end core part 1153, for example, extends along the propagation direction with substantially the same width as the final tapered width of the taper part 1152.

In addition, the length of each component in the propagation direction (−X direction) shown in FIG. 2 is as follows. The length L1 of the wide core base part 1151 is approximately 2-200 μm. The length L2 of the taper part 1152 is approximately 30-200 μm. The length L3 of the narrow front end core part is approximately 0.5-100 μm.

On one of the planar surfaces of the wide core base 1151, a grating 1200 is formed. The grating 1200 is formed by engraving concave grooves 1201 having a rectangular cross-section in the width direction (Y direction) on the planar surface. The number of the concave grooves 1201 may be approximately 10-200.

The grating 1200 is formed by engraving the concave grooves on the planar surface of the core and by filling the concave grooves with a cladding material (see FIG. 3). It is noted that efficient coupling of the light is not achieved in a grating structure with protrusions, instead of the concave grooves, which protrude from one of the planar surfaces of the wide core base part 1151.

As shown in FIG. 1, the grating 1200 in the present invention is formed to be optically coupled with the laser light that is incident perpendicularly onto the surface of the wide core base part 1151 on which the grating 1200 is formed. The laser light is emitted from a light source unit 1400 (e.g., a laser diode 1400) that is positioned to oppose the wide core base part 1151, for example. A frequency of the grating 1200 (grating pitch P: pitch P of the concave grooves 1201) is formed to be smaller than the wavelength λc (nm) of the laser light that is emitted perpendicularly.

In other words, the pitch of the grating 1200 is formed to satisfy an inequality expression: Grating pitch P (nm)<Wavelength λc (nm) of laser light. The wavelength λc is referred to as the wavelength at the cladding 1300. In addition, in the present invention, the perpendicular entry is at an angle 90°±5°.

Figure 4:
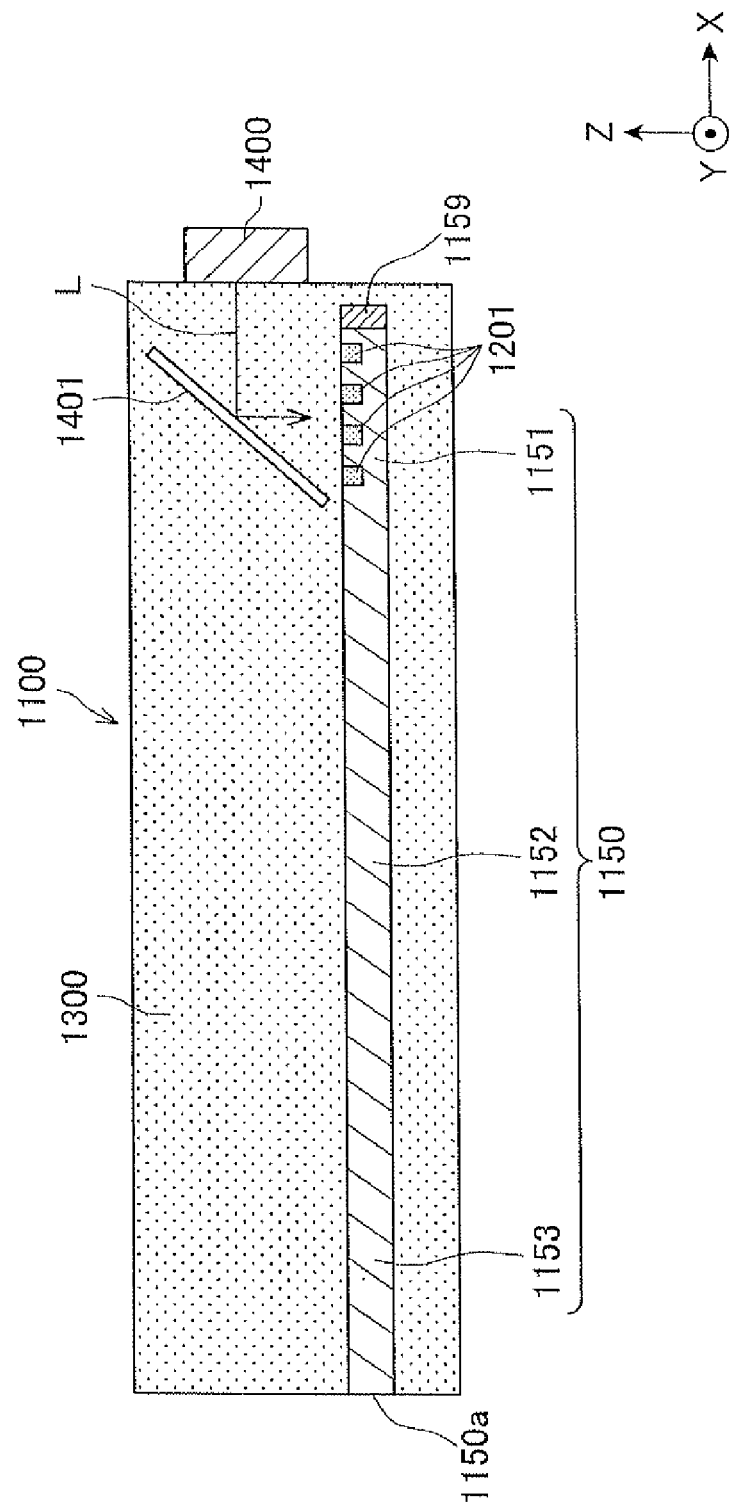
FIG. 4 is a figure corresponding to FIG. 1 and is a cross-sectional view illustrating another method by which the laser light is incident perpendicularly onto the grating formation surface of the core.

However, the configuration is not limited to that shown in FIG. 1. As shown in FIG. 4, the light source unit 1400 may be arranged on the rear side of the wide core base part 1151, and the laser light (L) may be reflected and incident perpendicularly onto the surface of the wide core base part 1151 on which the grating 1200 is formed, using a reflective film 1401. According to the configuration that uses the reflection of the laser light from the reflective film 1401 as shown in FIG. 4, there is an advantage that flexibility in selecting the location of the light source unit 1400 (flexibility of the arrangement in the Z direction) increases, for example.

In the present invention, a significant point is that the depth H1 of the concave groove 1201 of the grating 1200 is formed to satisfy the relationship H1=(0.33 to 0.67)×H2, more preferably H1=(0.45 to 0.55)×H2, where H2 is the thickness of the core base part 1151, as shown in FIG. 3.

The thickness H2 of the core base part 1151 is normally approximately 0.3-3.0 μm. Approximately 10-200 concave grooves 1201 are formed in the X direction.

The necessity of the relationship in the ratio between the thicknesses H1 and H2 is based on the following consideration. That is, by matching the intensity distribution and the phase of the light to be guided in the waveguide and the intensity distribution and the phase of the evanescent wave (near-field light) generated near the lower edge of the concave groove 1201 by the laser light that is incident perpendicularly onto the grating 1200, optical coupling between the incident laser light and the propagating light is possible. The optical coupling with the waveguide through the grating 1200 in the present invention is not based on diffraction. It is considered that the near-field light generated near the lower edge of the concave grooves 1201 does not itself propagate but that the energy of the near-field light is converted into energy that propagates through the waveguide.

The oscillation direction (polarization direction) of the incident laser light is preferably in the Y direction, which is the width direction of the wide core base part 1151 (e.g., a TE polarized wave).

Moreover, another significant point in the present invention is that a reflective film 1159 formed from an Au film or the like is provided on the other end surface (rear end part) of the core base part 1151, which is on the opposite side from the propagation direction. In the present invention, it is fundamental that the light is incident perpendicularly onto the grating 1200 formed on the core base part 1151. By providing the reflective film 1159, it ensures that the light propagates in the target propagation direction (−X direction).

Further, as shown in FIG. 2, the grating 1200 in the present invention is preferably a single grating. As discussed in the conventional art, it is possible that, with a dual grating in which single gratings are arranged in parallel with each other, the light interferes with each other in the propagation direction. The length Wo (Y direction) of the single grating is approximately 0.34-9.90 μm.

Such an optical waveguide as in the present invention allows reliable optical coupling of the laser light to the optical waveguide by emitting the laser light perpendicularly to the optical waveguide. In addition, the laser light can propagate in the desired direction through the optical waveguide. The optical waveguide of the present invention may be implemented in thermally-assisted magnetic recording heads, which are micro-sized magnetic recording heads and which include an optical waveguide, light transmission components, Si fine line waveguides, and the like.

The InP laser diode, GaAs laser diode, GaN laser diode or the like, which are normally used for communications, optical disk storage, material analysis and the like, may be used for the laser diode that generates the laser light. The wavelength $\lambda_L$ of the emitted laser light may be in a range of 375 nm-1.7 μm, for example.

The multilayer configuration of the optical waveguide shown in FIGS. 1-4 may be formed by a thin film fabrication technique, such as spattering, milling, reactive ion etching (RIE) and photoresist methods.

A preferred example of a thermally-assisted magnetic recording head, in which the optical waveguide of the present invention is advantageously implemented, is described below. However, the present invention is not limited to the configuration of the below-described thermally-assisted magnetic recording head itself.

(Description of Thermally Assisted Magnetic Recording Head)

Before describing the thermally-assisted magnetic recording head, terminologies used in the present application are defined. In the multilayer configuration and element configuration formed on an element formation surface of a slider substrate in the magnetic recording head, looking from a reference layer or element, the substrate side is a "lower side," and the opposite side is an "upper side."

Moreover, in embodiments of the magnetic head, "X, Y and Z directions" are provided in some drawings as necessary. The Z axis direction corresponds to the above-discussed upper-lower direction. The +Z side corresponds to the trailing side, and the −Z side corresponds to the reading side. The Y axis direction corresponds to the track width direction, and the X axis direction corresponds to the height direction.

Further, in the description of the magnetic recording head, "side surfaces" of the waveguide provided in the magnetic recording head indicate side surfaces other than the end surfaces that are perpendicular to the propagation direction (−X direction) of the laser light that propagates through the waveguide. Therefore, the "upper surface" and the "lower surface" of the waveguide in the description of the magnetic recording head are also considered as "side surfaces." The "side surfaces" are the surfaces in which the light that propagates through the waveguide, which corresponds to the core, is totally reflected.

Figure 5:
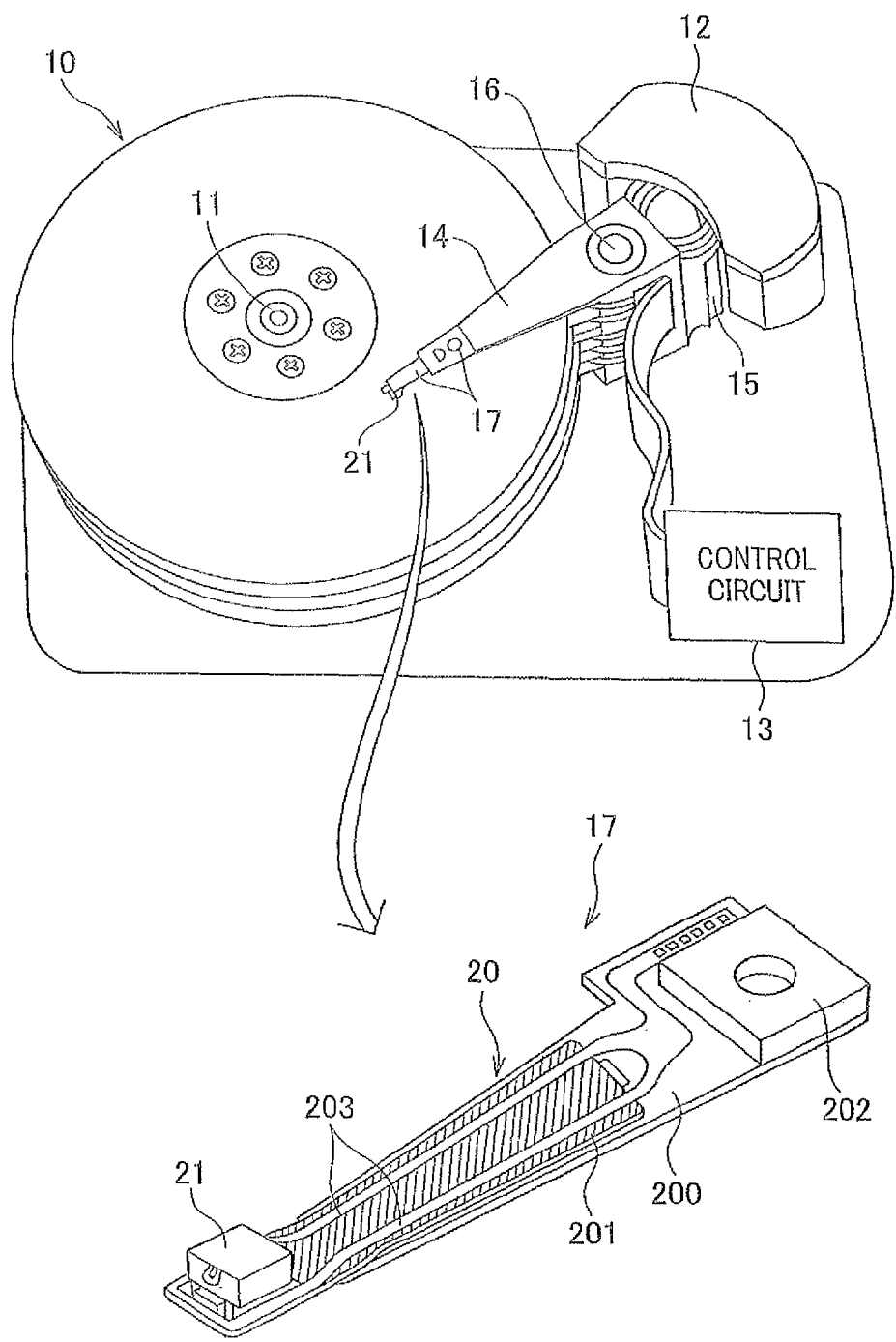
FIG. 5 is a perspective view that schematically illustrates a configuration of a main part of a magnetic recording medium and a head gimbal assembly (HGA) according to one embodiment in which the optical waveguide of the present invention can be implemented.

FIG. 5 is a perspective view that schematically illustrates a configuration of a main part of a magnetic recording medium and a head gimbal assembly (HGA) according to one embodiment. In the perspective view of the HGA, the side of the HGA that opposes the surface of the magnetic recording medium is shown on the upper side.

The magnetic disk device shown in FIG. 5, which is the magnetic recording device, includes a plurality of magnetic disks 10, which is a magnetic recording medium, that rotates about a rotational shaft of a spindle motor 11, an assembly carriage device 12 on which a plurality of drive arms 14 are provided, a head gimbal assembly (HGA) 17 that is attached to the tip end of each drive arm 14 and that includes a thermally-assisted magnetic recording head 21, which is a thin film magnetic head, and a recording/reproducing and light emission control circuit 13 that controls the writing and reading operations of the thermally-assisted magnetic recording head 21 and that controls the light emission operation of a laser diode, which is a light source, that generates laser light for the later-discussed thermally-assisted magnetic recording.

The magnetic disks 10 are for the perpendicular magnetic recording in the present embodiment and have a configuration in which a soft magnetic under layer, an intermediate layer, and a magnetic recording layer (perpendicular magnetic layer) are sequentially layered on a disk substrate. The assembly carriage device 12 is a device for positioning the thermally-assisted magnetic recording head 21 on a track, which is formed on the magnetic recording layer of the magnetic disk 10 and in which recording bits are arrayed. In the assembly carriage device 12, the drive arms 14 are stacked in a direction along the pivot bearing shaft 16 and are angularly swingable about the shaft 16 by a voice coil motor (VCM) 15.

The magnetic disk device according to the present invention is not limited to the above-described configuration. The number of the magnetic disk 10, the drive arm 14, the HGA 17 and the thermally-assisted magnetic recording head 21 may be singular.

In addition, according to FIG. 5, in the HGA 17, a suspension 20 is formed from a load beam 200, a flexure 201 that is fixed to the load beam 200 and has elasticity, and a base plate 202 provided at a base of the load beam 200. On the flexure 201, a wiring member 203 is provided that is formed from a lead conductor and a connection pad that is electrically connected to both sides of the lead conductor. The thermally-assisted magnetic recording head 21 is fixed at the front tip of the suspension 20 and on the flexure to oppose the surface of the respective magnetic disk 10 with a predetermined gap (flying height). Moreover, an end of the wiring member 203 is electrically connected to a terminal electrode of the thermally-assisted magnetic recording head 21.

The suspension 20 is also not limited to the above-described configuration. Although not shown, a head driving integrated circuit (IC) chip may be installed in the middle of the suspension 20.

Figure 6:
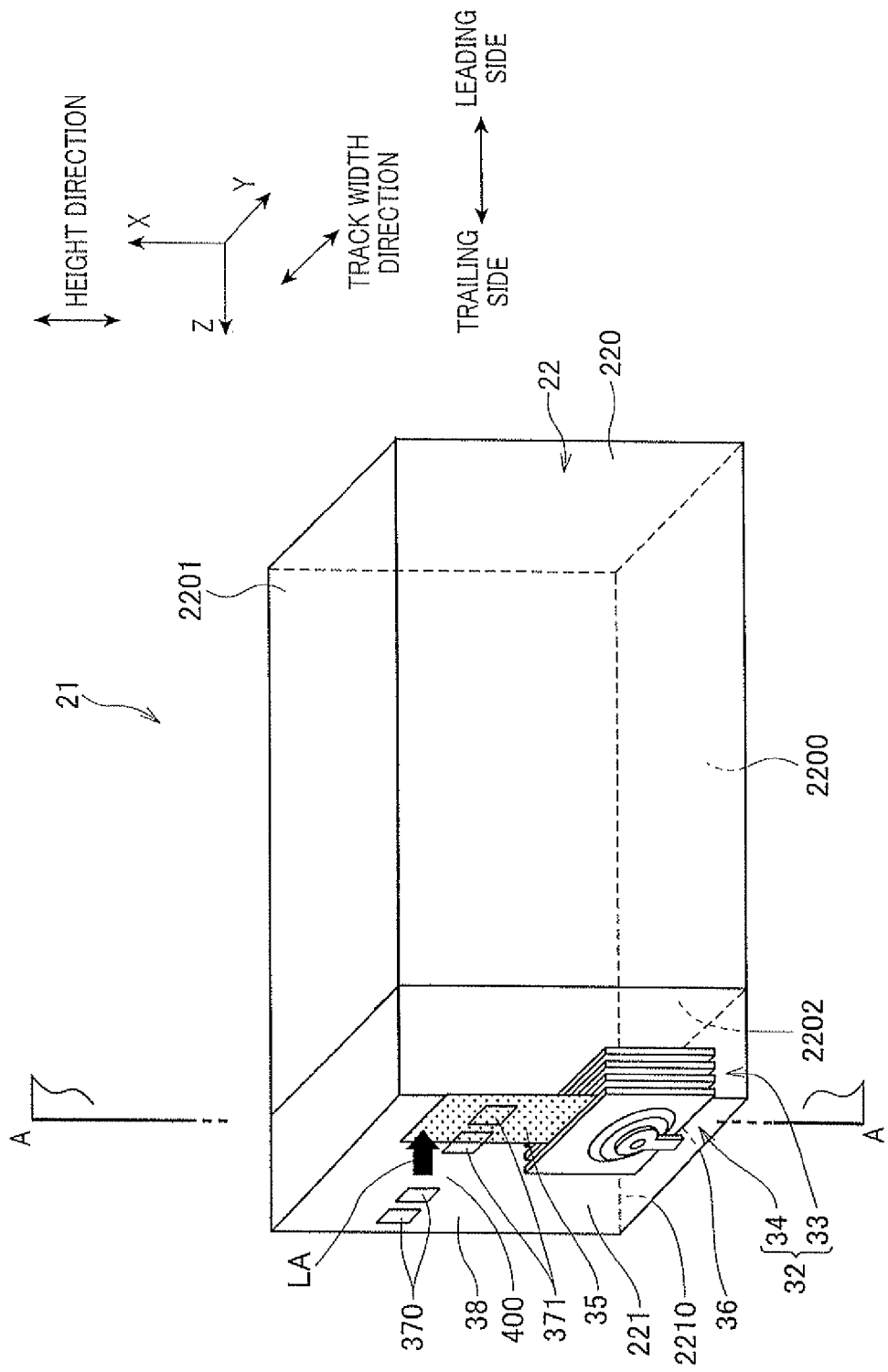
FIG. 6 is a perspective view that schematically illustrates a configuration of a main part of a thermally-assisted magnetic recording head in which the optical waveguide of the present invention can be implemented.

FIG. 6 is a perspective view that illustrates an embodiment of the thermally-assisted magnetic recording head of the present invention.

However, in the head shown in FIG. 6, a description of a laser light generating device (light source unit) is omitted, which emits the laser light in the direction perpendicular to the grating formed on the wide core base, which is the base part of the optical waveguide. The laser light that is incident in the perpendicular direction is simply shown by an arrow LA indicating the state of irradiation.

The laser light generating device (light source unit) may be arranged to oppose the core of the optical waveguide as shown in FIG. 1 or may be arranged on the rear end of the core of the optical waveguide to cause the laser light to be incident perpendicularly onto the grating via a reflective film, as shown in FIG. 4, for example. Various forms may be considered as a method for installing the laser light generating device (light source unit) in the head. The laser light generating device (light source unit) may be installed in the head as formed externally in advance or may be formed from a thin film in the head using a film formation technique.

As shown in FIG. 6, the thermally-assisted magnetic head 21 includes a slider 22.

The slider 22 is formed from ALTIC ($Al_2O_3$—TiC) or the like and includes a slider substrate 220 that has a flying surface, or an air bearing surface (ABS), 2200 formed to obtain an appropriate flying height, and a head part 221 formed on an element formation surface 2202 that is perpendicular to the ABS 2200.

The head part 221 formed on the element formation surface 2202 on the slider substrate 220 of the slider 22 includes: a head element 32 formed from an MR element 33 for reading data from the magnetic disk and an electromagnetic conversion element 34 for writing data in the magnetic disk; a waveguide 35 that directs the laser light from a laser diode in the light source unit (not shown) to the medium opposing surface side; a plasmon generator 36 which, together with the waveguide 35, forms a near-field generator; a passivation layer 38 formed on the element formation surface 2202 to cover the MR element 33, the electromagnetic conversion element 34, the waveguide 35 and the plasmon generator 36; a pair of terminal electrodes 370 that are exposed from the upper surface of the passivation layer 38 and that are electrically connected to the MR element 33; and a pair of terminal electrodes 371 that are also exposed from the upper layer of the passivation layer 38 and that are electrically connected to the electromagnetic conversion element 34. The near-field generator is formed from the plasmon generator and the waveguide.

The waveguide 35 is formed from the same material as the core material for, and thus are equivalent with, the core 1150 as discussed using FIGS. 1-4. Due to the size of the drawing sheet and the like, the waveguide 35 may not be drawn the same as the core configuration shown in FIGS. 1-4. However, it is actually the same.

The electrode terminals 370 and 371 are electrically connected to the connection pad of the wiring member 203 provided on the flexure 201 (see FIG. 5).

Ends of the MR element 33, the electromagnetic conversion element 34 and the plasmon generator 36 extend to a head part end surface 2210, which is the medium opposing surface of the head part 221. The head part end surface 2210 and the ABS 2200 form the medium opposing surface of the entire thermally-assisted magnetic recording head 21.

For the actual writing and reading of data, the thermally-assisted magnetic recording head 21 aerodynamically flies over the rotating magnetic disk with a predetermined flying height. At this time, the MR element 33 and the electromagnetic conversion element 34 oppose the surface of the magnetic recording layer of the magnetic disk with an appropriate magnetic spacing.

In this state, the MR element 33 reads data by sensing a data signal magnetic field from the magnetic recording layer, and the electromagnetic conversion element 34 writes data by applying the data signal magnetic field onto the magnetic recording layer. For writing data, the laser light that is emitted from the laser diode of the light source unit perpendicularly onto the grating 1200 of the waveguide 35 and that propagates through the waveguide 35 is coupled with the plasmon generator 36 at a surface plasmon mode as discussed below. Thereby, the surface plasmon is excited at the plasmon generator 36.

By the surface plasmon propagating on a propagative edge provided on the later-discussed plasmon generator 36 towards the head part end surface 2210, the near-field light is generated at the end of the plasmon generator 36 on the side of the head part end surface 2210. This near-field light reaches the surface of the magnetic disk and heats a part of the magnetic recording layer of the magnetic disk. Accordingly, the anisotropic magnetic field (coercive force) of that part is decreased to a value at which the writing can be achieved. As a result, the thermally-assisted magnetic recording can be performed.

Figure 7:
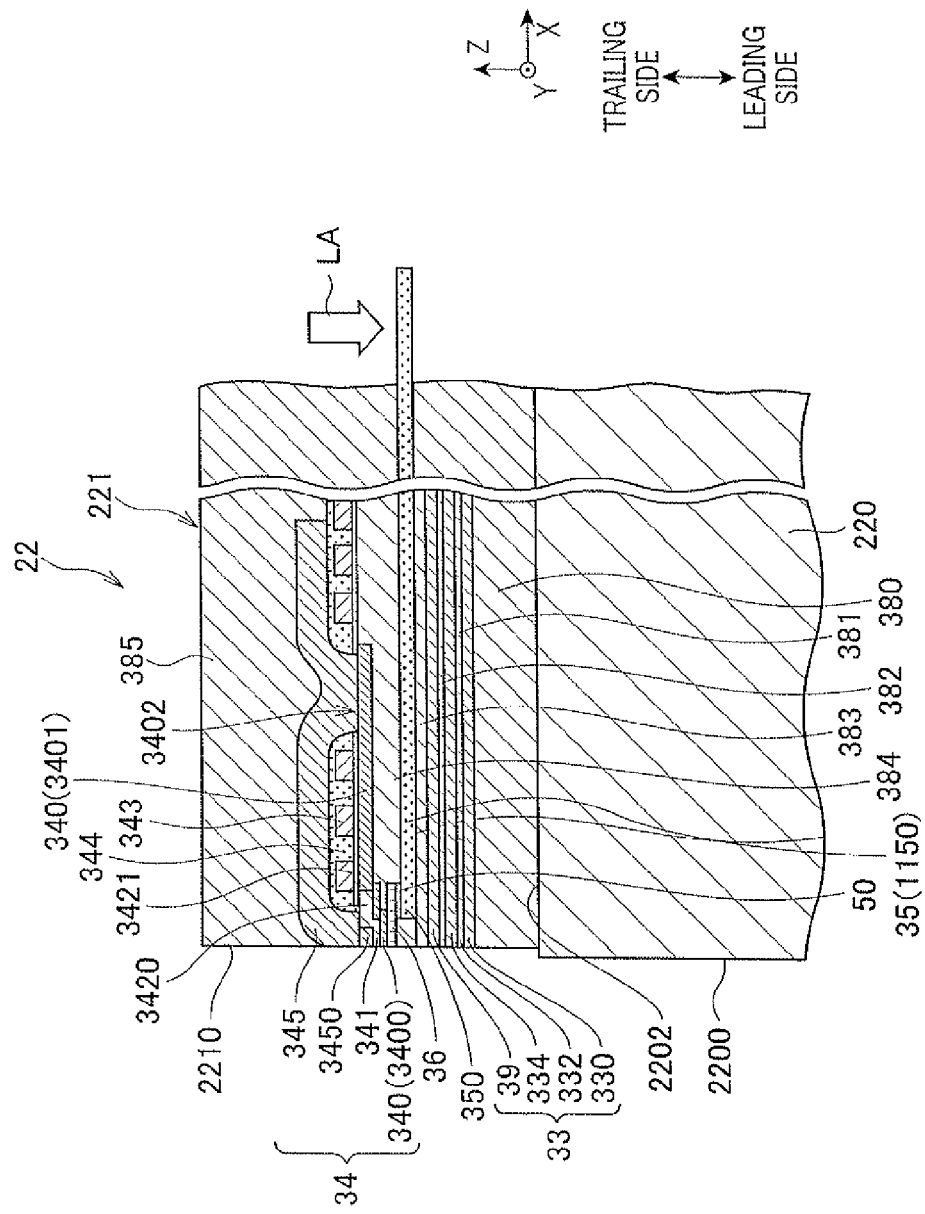
FIG. 7 is a cross-sectional view from the A-A plane in FIG. 6, which schematically illustrates a configuration of the main part of the thermally-assisted magnetic recording head.

FIG. 7 is a cross-sectional view from the A-A plane in FIG. 6, which schematically illustrates a configuration of the main part of the thermally-assisted magnetic recording head 21.

As shown in FIG. 7, the MR element 33 includes an MR multilayer body 332, a lower shield layer 330 and an upper shield layer 334. The lower shield layer 330 and the upper shield layer 334 are arranged as a pair to sandwich the MR multilayer body 332 and an insulating layer 381. The MR element 33 is formed on the insulating layer 380, which is formed on the element formation layer 2202. The upper and lower shield layers 334, 330 prevent the MR multilayer body 332 from being affected by an external magnetic field that becomes noise.

The upper shield layer 334 and the lower shield layer 330 are magnetic layers formed by frame plating or spattering, for example. The upper shield layer 334 and the lower shield layer 330 are formed from a soft magnetic material, for example NiFe (permalloy), FeSiAl (Sendust), CoFeNi, CoFe, FeN, FeZrN, CoZrTaCr or the like, or a multilayer film formed from these materials. The thickness of the upper shield layer 334 and the lower shield layer 330 is approximately 0.5-3 µm, for example.

The MR multilayer body 332 is a magnetically sensitive part that senses the signal magnetic field using the MR effect and may be any of a current-in-plane giant magnetoresistive (CIP-GMR) multilayer body that uses a current-in-plane giant magnetoresistive effect, a current-perpendicular-to-plane giant magnetoresistive (CPP-GMR) multilayer body that uses a current-perpendicular-to-plane giant magnetoresistive effect, and a tunnel-magnetoresistive (TMR) multilayer body that uses a tunnel magnetoresistive effect.

The MR multilayer body 332, which uses any of the MR effects, is capable of sensing the signal magnetic field from the magnetic disk at high sensitivity. If the MR multilayer body 332 is a CPP-GMR multilayer body or a TMR multilayer body, the upper shield layer 334 and the lower shield layer 330 function as electrodes also. On the other hand, if the MR multilayer body 332 is a CIP-GMR multilayer body, insulating layers are provided between the MR multilayer body 332 and each of the upper shield layer 334 and the lower shield layer 330. Moreover, an MR lead layer that is electrically connected to the MR multilayer body 332 is provided.

When the MR multilayer body 332 is a TMR multilayer body, the MR multilayer body 332 may have, for example, a configuration in which the following are sequentially laminated: an antiferromagnetic layer of IrMn, PtMn, NiMn, RuRhMn or the like having a thickness of approximately 5-15 nm; a magnetization pinned layer that has a configuration in which two ferromagnetic layers of CoFe or the like sandwich a nonmagnetic metal layer of Ru or the like and of which a magnetization direction is pinned by the antiferromagnetic layer; a tunnel barrier layer of a nonmagnetic dielectric material, which is a metal film of Al, AlCu or the like having a thickness of 0.5-1 nm is oxidized by oxygen introduced in a vacuum device or by natural oxidation; and a magnetization free layer that is formed from two layers: a layer of CoFe or the like having a thickness of approximately 1 nm and a layer of NiFe or the like having a thickness of approximately 3-4 nm, which are ferromagnetic materials; and that achieves a tunnel exchange coupling with the magnetization pinned layer through the tunnel barrier layer.

Also shown in FIG. 7, the electromagnetic conversion element 34 is for perpendicular magnetic recording and includes a main magnetic pole layer 340, a gap layer 341, a writing coil layer 343, a coil insulating layer 344 and a write shield layer 345.

The main magnetic pole 340 is formed on an insulating layer 384 made of an insulation material, such as $Al_2O_3$ (alumina) and forms a waveguide for guiding, while accommodating, a magnetic flux generated by applying a writing current to the writing coil layer 343, to the magnetic recording layer (perpendicular magnetization layer) of the magnetic disk in which the writing is performed.

The main magnetic pole layer 340 has a configuration in which a main magnetic pole 3400 and a main magnetic pole body part 3401 are sequentially layered. Of these, the main magnetic pole 3400 extends to the head part end surface 2210 and includes a first main magnetic pole part 3400c having a small width $W_p$ in the track width direction (see FIG. 9) and a second main magnetic pole part 3400a positioned above and on the rear side (+X side) of the first main magnetic pole part 3400a.

With the first main magnetic pole part 3400a having the small width $W_p$, a minute writing magnetic field can be generated, which allows the track width to be the minimum value for increasing the recording density.

The main magnetic pole 3400 is formed by a soft magnetic material having a higher saturation magnetic flux density than the main magnetic pole body part 3401. For example, the main magnetic pole 3400 is formed by a soft magnetic material, such as FeNi, FeCo, FeCoNi, FeN or FeZrN, which are ferroalloy materials having Fe as a main component. The thickness of the first main magnetic pole part 3400a is 0.1-0.8 µm, for example.

The gap layer 341 forms a gap for magnetically separating the main magnetic pole layer 340 and the writing shield layer 345 near the head end surface 300. The gap layer 341 is formed from a non-magnetic insulating material, such as $Al_2O_3$ (alumina), $SiO_2$ (silica dioxide), AlN (aluminum nitride) and a diamond-like carbon (DLC), or a non-magnetic conductive material, such as Ru (ruthenium). The thickness of the gap layer 341 regulates the gap between the main magnetic pole layer 340 and the writing shield layer 345 and is approximately 0.01-0.5 µm, for example.

With writing coil layer 343 is formed to pass between at least the main magnetic pole layer 340 and the writing shield layer 345 in one turn, for example, on the insulating layer 3421, which is formed from a conductive material, such as $Al_2O_3$ (alumina). The writing coil layer 343 has a spiral structure that winds on the back contact part 3402.

The writing coil layer 343 is formed from a conductive material, such as Cu (copper). The writing coil insulating layer 344, which is formed from an insulating material, such as thermally cured photoresist, covers the writing coil layer 343 and provides electrical insulation between the writing coil layer 343 and the main magnetic pole layer 340 and between the writing coil layer 343 and the writing shield layer 345.

The writing coil layer 343 is a single layer in the present embodiment but may include two or more layers or may be a helical coil. In addition, the number of turns is not limited to that shown in FIG. 7 but may be set at 2 to 7 turns.

The writing shield layer 345 extends to the head part end surface 2210 and functions as a magnetic guide path for the magnetic flux that returns from the soft magnetic under layer provided under the magnetic recording layer (perpendicular magnetized layer) of the magnetic disk. The thickness of the writing shield layer 345 is approximately 0.5-5 µm, for example. In addition, in the writing shield layer 345, the part that opposes the main magnetic pole layer 340 also extends to the head part end surface 2210 and forms a trailing shield 3450 for taking in the magnetic flux that is generated and dispersed from the main magnetic pole layer 340.

The trailing shield 3450 is planarized with the insulating layer 3420 and the main magnetic pole body part 3401 in the present embodiment. The trailing shield 3450 has a width in the track width direction that is large than not only the first magnetic pole part 3400a but also the main magnetic pole body part 3401. By providing such a trailing shield 3450, the magnetic field gradient becomes steeper between the end part of the trailing shield 3450 and the first main magnetic pole part 3400a. As a result, the signal output jitter is reduced, and the reading error rate is lowered. In addition, the write shield 345 is formed from a soft magnetic material. In particular, the trailing shield 3450 is formed from NiFe (Permalloy), which is the same ion-based alloy material as the main magnetic pole 3400, or the like that has a high saturation magnetic flux density.

Also as shown in FIG. 7, the waveguide 35 and the plasmon generator 36 are provided between the MR element 33 and the electromagnetic conversion element 34. The waveguide 35 and the plasmon generator 36 form a near-field generator, which is an optical system inside the head part 221.

The waveguide 35 (equivalent to reference 1150 in FIGS. 1, 2 and 4) is formed in parallel with the element formation surface 2202 and extends to the end surface 350 on the side of the head part end surface 2210.

Moreover, a part of the upper surface (side surface) of the waveguide 35 and a part of the lower surface (including the propagative edge 360 in FIG. 8) of the plasmon generator 36 oppose each other with a predetermined gap. The part sandwiched by these parts forms a buffer portion 50 that has a lower refractive index than the waveguide 35.

The buffer portion 50 functions to couple the laser light that propagates through the waveguide 35 with the plasmon generator 36 in a surface plasmon mode. Further, the buffer portion 50 may be a part of the insulating layer 384, which is a part of the passivation layer 38 or may be an additional layer provided separately with the insulating layer 384. The waveguide 35, the plasmon generator 384 and the buffer portion 50 are further described with reference to FIG. 8.

Moreover, in the present embodiment, an interelement shield layer 39, which is sandwiched by the insulating layers 382 and 383, is provided between the MR element 33 and the electromagnetic conversion element 34 (waveguide 35). The interelement shield layer 39 functions to shield the MR element 33 from the magnetic field generated by the electromagnetic conversion element 34 and may be formed from the same soft magnetic material as that for the upper shield layer 334 and the lower shield layer 330. The interelement shield layer 39 may not be required. The configuration may be made without the interelement shield layer 39. In addition, a backing coil part may be formed between the interelement shield layer 39 and the waveguide 35.

The backing coil part is for generating a magnetic flux that cancels out a magnetic flux loop, which is generated from the electromagnetic conversion element 34 and which travels the upper shield layer 334 and the lower shield layer 330 of the MR effect element 33, and for suppressing the wide area adjacent track eraser (WATE) phenomenon, which is an unnecessary writing or erasing operation on the magnetic disk.

Figure 8:
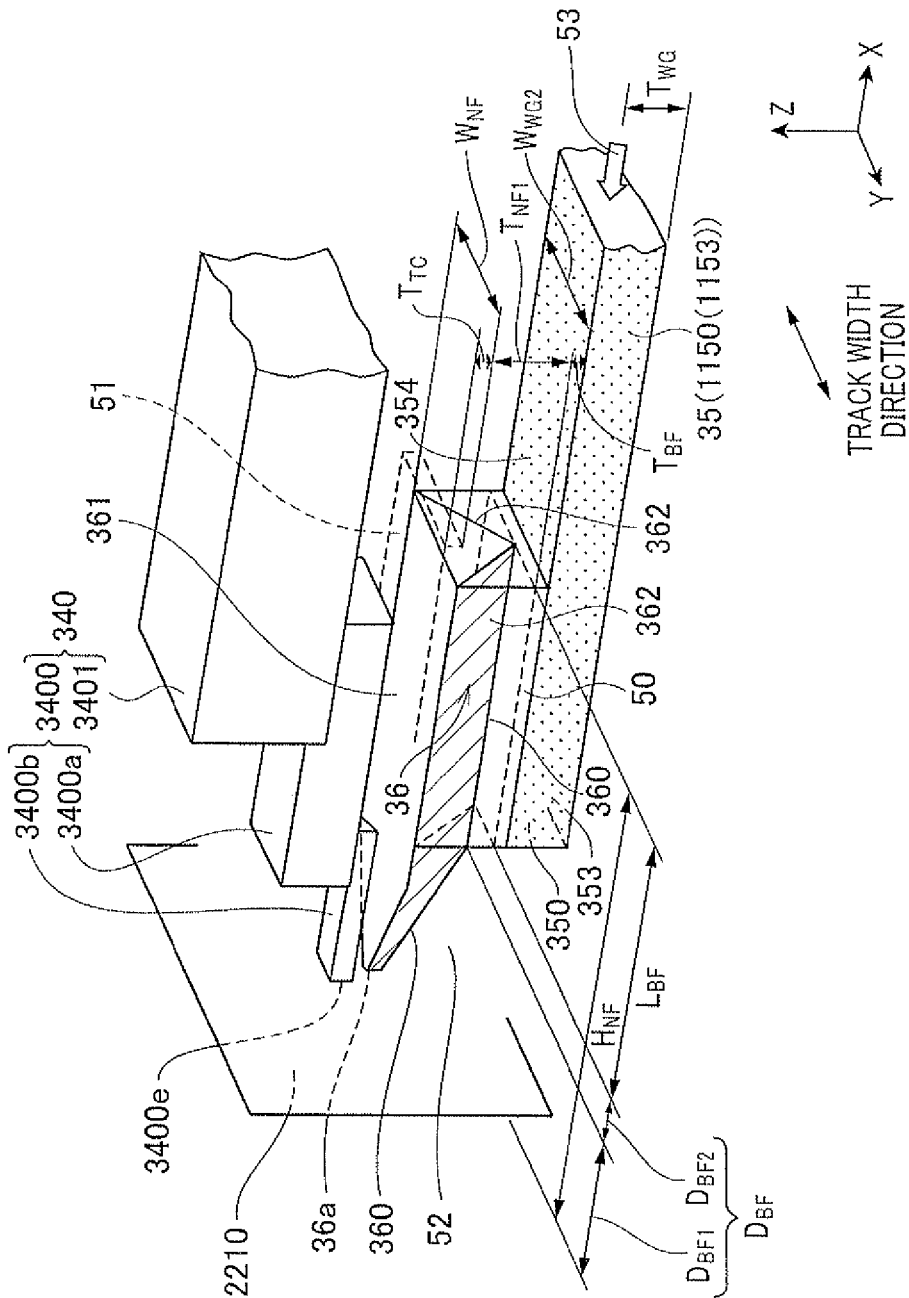
FIG. 8 is a perspective view that schematically illustrates a configuration including a waveguide, a plasmon generator and a main magnetic pole.

In the configuration of the head shown in FIGS. 7 and 8, it is necessary that the oscillation direction of the electric field of the laser light is perpendicular (Z axis direction: TM mode polarization) in the area where the waveguide 35 and the plasmon generator 36 are coupled with each other.

FIG. 8 is a perspective view that schematically illustrates a configuration including the waveguide 35, the plasmon generator 36 and the main magnetic pole layer 340. In this figure, the head part end surface 2210, which includes a position that irradiates the writing magnetic field and the near-field light towards the magnetic recording medium, is positioned on the left side.

As shown in FIG. 8, there are provided the waveguide 35 for the laser light 53 to propagate through for generating the near-field light and the plasmon generator 36 that includes the propagative edge 360, which is an edge on which the surface plasmon excited by the laser light 53 propagates.

The position of the waveguide 35 partially shown in FIG. 8 corresponds to the narrow front end core part 1153 shown in FIGS. 1-4.

In addition, the part sandwiched by a part of a side surface 354 of the waveguide 35 and a part of the lower surface 362, that includes the propagative edge 360 of the plasmon generator 36, which opposes the part of the side surface 354 of the waveguide 35, forms the buffer portion 50. That is, a part of the propagative edge 360 is covered by the buffer portion 50.

The buffer portion 50 functions to couple the laser light 53 with the plasmon generator 36 in the surface plasmon mode. Here, the "side surface" of the waveguide 35 indicates side surfaces that enclose the waveguide 35, excluding the end surface 350 on the side of the head part end surface 2210, which is perpendicular to the propagation direction (−X direction) of the laser light 53, and the end surface on the opposite side of the waveguide 35 (not shown). These side surfaces totally reflect the laser light 53 that propagates through the waveguide 35, which corresponds to the core.

In the present embodiment, the side surface 354 of the waveguide 35, which partially contacts the buffer portion 50, forms the upper surface of the waveguide 35. In addition, the buffer portion 50 may be a part of the passivation layer 38 (see FIG. 6) or may be an additional layer provided separately from the passivation layer 38.

The plasmon generator 36 includes a near-field generating end surface 36a that extends to the head part end surface 2210. The near-field generating end surface 36a is adjacent to the end surface 3400e of the main magnetic pole 3400, which extends to the head part end surface 2210. The propagative edge 360 extends to the near-field generating end surface 36a from a part that is covered by the buffer portion 50, at which the laser light 53 is coupled in the surface plasmon mode. The propagative edge 360 functions to allow the surface plasmon excited by the laser light 53 to propagate to the near-field generating end surface 36a.

A part of the propagative edge 360 on the side of the head part end surface 2210 is formed in a linear or curved shape that extends to become closer to the end surface 361, which is positioned on the opposite side from the propagative edge 360 of the plasmon generator 36, towards the near-field generating end surface 36a. The corner of the propagative edge 360 may be rounded to prevent a phenomenon in which the surface plasmon escapes from the propagative edge 360. At this time, the radius of curvature of the rounded corner is 5-500 nm, for example.

Moreover, in the present embodiment, the plasmon generator 36 has a shape that tapers down in the height direction (Z direction) towards the near-field generating end surface 36a near the head part end surface 2210.

Further, a cross-section of the plasmon generator 36 in the YZ plane forms a triangular shape. In particular, the cross-section forms a predetermined triangular shape near the head part end surface 2210. As a result, in the present embodiment, the near-field generating end surface 36a forms a triangular shape including the end of the propagative edge 360 that reaches the end surface 36a as one of the vertexes (see FIG. 9). The surface plasmon that propagates on the propagative edge 360 runs into the near-field generating end surface 36a, and thereby the near-field light is generated from the near-field generating end surface 36a.

The waveguide 35 and the buffer portion 50 are provided on the −Z side (lower side in the drawing) of the plasmon generator 36, that is, on the opposite side from the main magnetic pole 3400. Therefore, the propagative edge 360, which is covered by the buffer portion 50, is also provided on the opposite side of the main magnetic pole 3400. In this configuration, the waveguide 35 can be sufficiently separated from the main magnetic pole 3400 and the main magnetic pole body part 3401 even if the distance between the side surface 3400e of the main magnetic pole 3400, which generates the writing magnetic field, and the near-field generating end surface 36a, which generates the near-field light, is sufficiently small, preferably equal to or less than 100 nm. As a result, a situation can be avoided that a part of the laser light 53 is absorbed by the metallic main magnetic pole 3400 and the main magnetic pole body part 3401, causing a reduced light amount to be converted into the near-field light.

As shown in FIG. 8, the shape of the waveguide 35 (here, equivalent to the narrow front end core part 1153 in FIGS. 1-4) may be cubic. Alternatively, the width in the track width direction (Y axis direction) of the part of the waveguide 35 on the side of the head part end surface 2210 may be reduced. The width $W_{WG2}$ in the track width direction (Y axis direction) of the part of the waveguide 35 on the side of the end surface 350 may be set at approximately 0.3-100 μm, for example. The thickness $T_{WG}$ (in the Z axis direction) of that part may be 0.1-4 μm, and the height (length) (in the X direction) of that part may be 10-300 μm, for example.

Furthermore, the side surfaces of the waveguide 35, that is, the upper surface 354, the lower surface 353 and both side surfaces 351 in the track width direction (Y axis direction) contact the passivation layer 38 (see FIG. 6), with an exception of the part that contacts the buffer portion 50. The waveguide 35 is formed from a material formed by spattering or the like, for example, which has a higher refractive index $n_{WG}$ than the refractive index $n_\alpha$ of the material forming the passivation layer 38. For example, when the wavelength $\lambda_L$ of the laser light is 633 nm, and when the passivation layer 38 is formed of SiO₂ (n=1.5), the waveguide 35 may be formed of Al₂O₃ (n=1.63). In addition, when the passivation layer 38 is formed of Al₂O₃ (n=1.63), the waveguide 35 may be formed of $SiO_xN_Y$ (n=1.7-1.85), Ta₂O₅ (n=2.16), Nb₂O₅ (n=2.33), TiO (n=2.3-2.55) or TiO₂ (n=2.3-2.55). By forming the waveguide 35 with such materials, passivation loss of the laser light 53 can be suppressed with excellent optical characteristics that the materials have themselves. Further, while the waveguide 35 functions as a core, the passivation layer 38 functions as a cladding, thereby establishing the condition for total reflection by all of the side surfaces. As a result, more laser light 53 reaches the position of the buffer portion 50, and thus, the propagation efficiency of the waveguide 35 increases.

The plasmon generator 36 is preferably formed of a conductive material, such as a metal (e.g., Pd, Pt, Rh, Ir, Ru, Au, Ag, Cu or Al) or an alloy made of at least two types of these metals. Moreover, the width $W_{NF}$ in the track width direction (Y axis direction) of the upper surface 361 of the plasmon generator 36 is small enough than the wavelength of the laser light 53 and is approximately 10-100 nm, for example. The thickness $T_{NF1}$ (in the Z direction) is also small enough than the wavelength of the laser light 53 and is approximately 10-100 nm, for example. The length (height) $H_{NF}$ (in the X axis direction) is approximately 0.8-6.0 μm, for example.

The buffer portion 50 is formed by a dielectric material that has a lower refractive index $n_{BF}$ than the refractive index $n_{WG}$ of the waveguide 35. If the wavelength $\lambda_L$ of the laser light is 633 nm, and if the waveguide 35 is formed of Al₂O₃ (n=1.63), the buffer portion 50 may be formed of SiO₂ (n=1.46).

In addition, if the waveguide 35 is formed of Ta₂O₅ (n=2.16), the buffer portion 50 may be formed of SiO₂ (n=1.46) or Al₂O₃ (n=1.63). In these cases, the buffer portion 50 may be formed as a part of the passivation layer 38 (FIG. 6), which is formed of SiO₂ (n=1.46) or Al₂O₃ (n=1.63) and functions as a cladding.

Moreover, the length $L_{BF}$ (in the X axis direction) of the buffer portion 50, that is, the length of the coupled part between the waveguide 35 and the plasmon generator 36, is preferably 0.5-5 μm. The thickness $T_{BF}$ (in the Z axis direction) of the buffer portion 50 is preferably 10-200 nm. The length $L_{BF}$ and thickness $T_{BF}$ of the buffer portion 50 are important parameters for achieving appropriate excitation and propagation for the surface plasmon.

Further, the end of the buffer portion 50 on the side of the head part end surface 2210 is separated from the head part end surface 2210 by the distance $D_{BE}$ in the X axis direction. The propagation distance for the surface plasmon is adjusted by the distance $D_{BF}$.

Also as shown in FIG. 8, a thermal conductive layer 51 is preferably provided between the plasmon generator 36 and the first main magnetic pole part 3400a and on the side of the head part end surface 2210. The thermal conductive layer 51 is formed from an insulating material, for example, AlN, SiC or DLC or the like, which have higher thermal conductivity than the passivation layer 38 (see FIG. 6). By providing such a thermal conductive layer 51, a part of the heat produced from generating the near-field light by the plasmon generator 36 can escape to the main magnetic pole 3400 and the main magnetic pole body part 3401 through the thermal conductive layer 51.

That is, the main magnetic pole 3400 and the main magnetic pole body part 3401 can be used as a heat sink. As a result, an excess temperature increase in the plasmon generator 36 can be suppressed, and an unnecessary protrusion of the near-field generating end surface 36a and a significant decrease in the optical power efficiency for the plasmon generator 36 can be avoided.

The thickness $T_{TC}$ of the thermal conductive layer 51 corresponds to the gap $D_{N-P}$ (see FIG. 9) between the near-field generating end surface 36a and the end surface 3400e of the main magnetic pole 3400 on the head part end surface 2210. The thickness $T_{TC}$ is set at 100 nm or less, which is small enough.

Moreover, the refractive index $n_{IN2}$ of the thermal conductive layer 51 is formed to be the same as or lower than the refractive index $n_{IN1}$ of the insulating layer 52, which covers the propagative edge 360 of the plasmon generator 36. That is, the propagative edge 360 of the plasmon generator 36 is covered by a material having the refractive index $n_{IN1}$, which is the same as or higher than the refractive index $n_{IN2}$ of a material that covers the end surface 361 on the opposite side from the propagative edge 360.

As a result, the surface plasmon can stably propagate on the propagative edge 360. Actually, it is known that the refractive index $n_{IN1}$ is preferably equal to or greater than the refractive index $n_{IN2}$ multiplied by 1.5 (refractive index $n_{IN1} \geq$ refractive index $n_{IN2} \times 1.5$).

Also as shown in FIG. 8, the main magnetic pole layer 340 includes the main magnetic pole 3400 and the main magnetic pole main body 3401, as discussed above. Of these, the main magnetic pole 3400 includes the first main magnetic pole part 3400a and the second main magnetic pole part 3400b. The second main magnetic pole part 3400b includes the end surface 3400e, which extends to the head part end surface 2210. The second main magnetic pole part 3400b includes an end part on the side of the head part end surface 2210, which overlaps a part of the first main magnetic pole part 3400a on the opposite side from the head part end surface 2210.

Furthermore, the end of the main magnetic pole body part 3401 on the side of the head part end surface 2210 overlaps the part of the second main magnetic pole part 3400b on the opposite side from the head part end surface 2210. Therefore, the part of the main magnetic pole layer 340 on the side of the head part end surface 2210 inclines with respect to the element formation surface 2202 (see FIG. 7) so that the main magnetic pole layer 340 becomes closer to the end part of the plasmon generator 36 on the side of the head part end surface 2210 towards the head part end surface 2210. As a result, the end surface 3400e of the main magnetic pole 3400 and the near-field generating end surface 36a can be provided sufficiently adjacent while sufficiently separating the main magnetic pole layer 340 and the waveguide 35.

Figure 9:
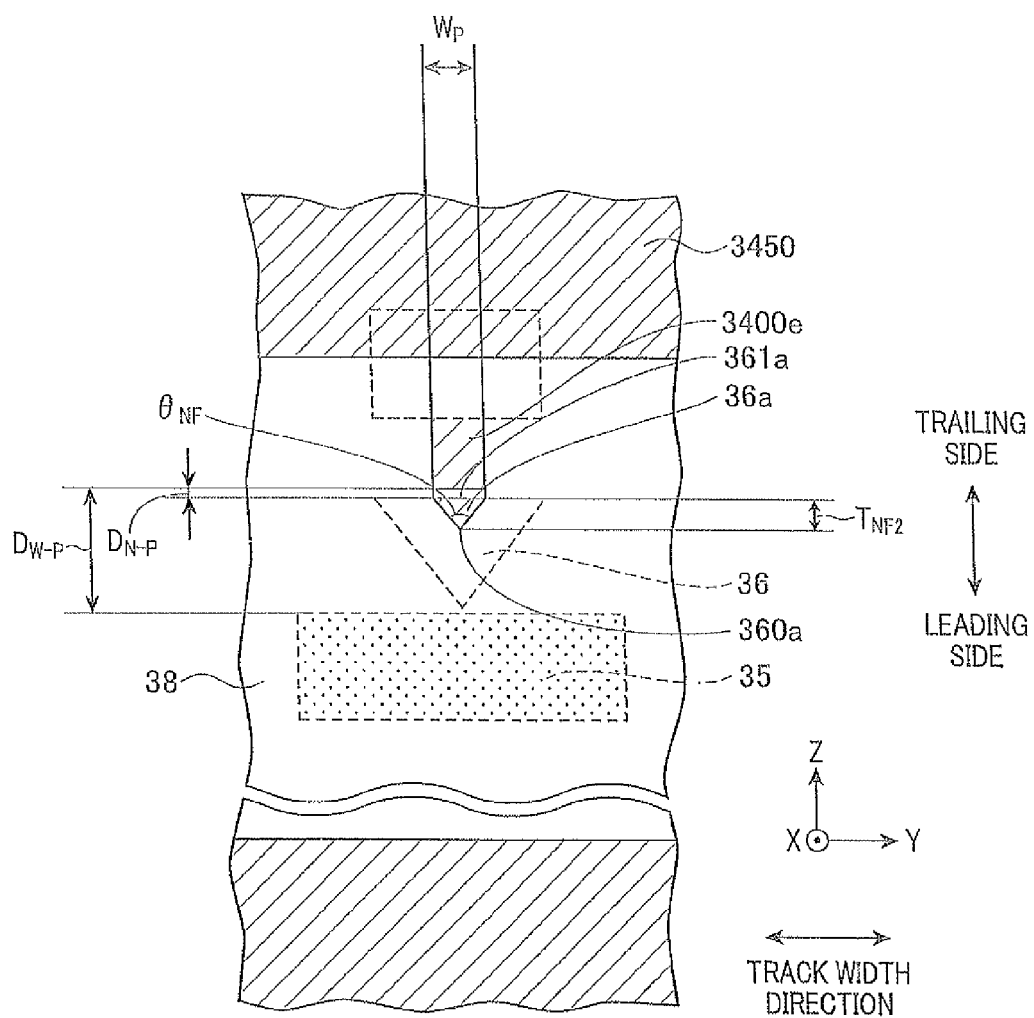
FIG. 9 is a plan view that illustrates shapes of end surfaces of the plasmon generator and the electromagnetic conversion element on a head part end surface.

FIG. 9 is a plan view that illustrates a shape of the end surface of the plasmon generator 36 and the electromagnetic conversion element 34 on the head part end surface 2210.

As shown in FIG. 9, in the electromagnetic conversion element 34, the main magnetic pole 3400 (first main magnetic pole part 3400a) and the writing shield layer 345 (trailing shield 3450) extend to the head part end surface 2210. Of these, the shape of the end surface 3400e of the main magnetic pole 3400 on the head part end surface 2210 may be rectangular, square or trapezoidal, for example.

The above-described width $W_p$ is a length of a side of the end surface 3400e of the main magnetic pole 3400 on the reading side and sets the width of tracks formed on the magnetic recording layer of the magnetic disk. The width $W_p$ is approximately 0.05-0.5 μm, for example.

In addition, on the head end part end surface 2210, the near-field generating end surface 36a of the plasmon generator 36 is positioned in the vicinity of the end surface of the main magnetic pole 3400 and on the reading side (−Z side) of the end surface 3400e. Here, the gap $D_{N-P}$ is a sufficiently small value, such as 100 nm or less, and preferably 20 nm or more, or more preferably 30 nm or more, where $D_{N-P}$ is a gap between the near-field generating end surface 36a and the end surface 3400e.

In the thermally-assisted magnetic recording of the present embodiment, because the near-field generating end surface 36a is the main heating part, and because the end surface 3400e is the writing part, a writing magnetic field with a sufficiently large gradient can be applied to a part of the magnetic recording layer of the magnetic disk that has been sufficiently heated. Therefore, the stable writing operation using thermal assistance can be reliably accomplished.

Further, in the present embodiment, the near-field generating end surface 36a forms an isosceles triangle on the head part end surface 2210, which includes a bottom edge 361a on the trailing side (+Z side) and an end 360a of the propagative edge 360 as a vertex on the reading side (−Z side). The height $T_{NF2}$ of the near-field generating end surface 36a (height of the plasmon generator 36 on the head part end surface 2210) is preferably equal to or less than 30 nm, and more preferably equal to or less than 20 nm. As a result, the emitting point for the near-field light on the near-field generating end surface 36a is in the vicinity of the bottom edge 361a on the trailing side and becomes closer to the end surface 3400e of the main magnetic pole 3400.

The vertex angle $\theta_{NF}$ of the vertex 360a of the isosceles triangle is preferably 60°-130°, and more preferably 80°-110°. By adjusting the vertex angle $\theta_{NF}$, the emitting point for the near-field light on the near-field generating end surface 36a can be arranged on the trailing side.

Furthermore, the gap $D_{W-P}$, which is the gap between the waveguide 35 and the main magnetic pole 3400, can be sufficiently large while the above-described gap $D_{N-P}$ is formed at an extremely small value. According to the configuration shown in FIG. 9, the waveguide 35 can be sufficiently separated from the main magnetic pole 3400 and the main magnetic pole body part 3401. As a result, a part of the laser light is prevented from being absorbed by the metallic main magnetic pole 3400 and main magnetic pole body part 3401 so as to cause the amount of the laser light converted into the near-field light to be decreased.

Figure 10:
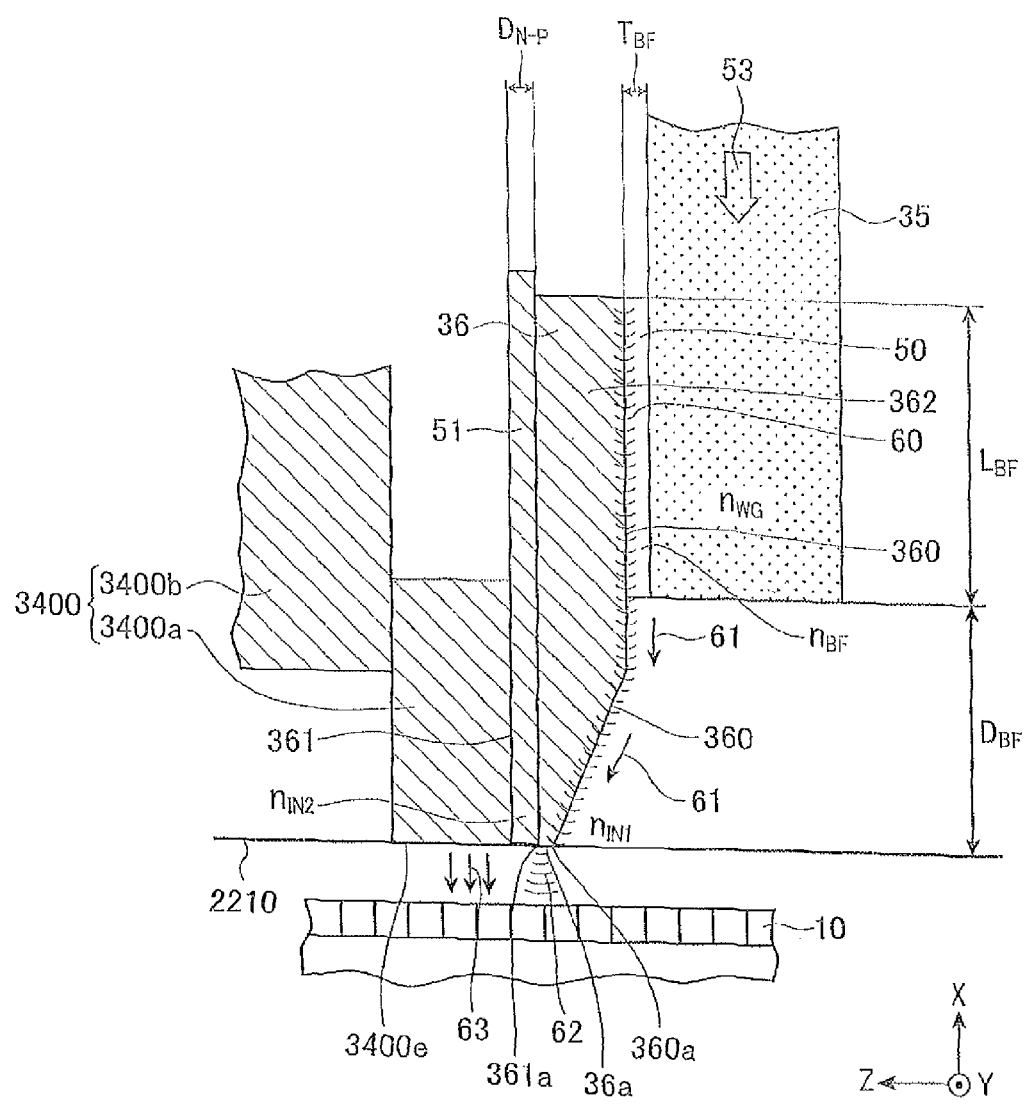
FIG. 10 is a schematic diagram for explaining the thermally-assisted magnetic recording using a surface plasmon mode.

FIG. 10 is a schematic diagram for explaining the thermally-assisted magnetic recording using a surface plasmon mode.

As shown in FIG. 10, for writing information in the magnetic recording layer of the magnetic disk 10 by the electromagnetic conversion element 34, the laser light 53 emitted from the laser diode 40 of the light source unit 23 first propagates through the waveguide 35. Then, the laser light 53 that has advanced to the vicinity of the buffer portion 50 is coupled to the optical configuration formed by the waveguide 35 that has a refractive index $n_{WG}$, the buffer portion 50 having a refractive index $n_{BF}$, and the plasmon generator 36 formed by a conductive material, such as metal, to excite a surface plasmon mode on the propagative edge 360 of the plasmon generator 36. That is, the laser light 53 is coupled to the plasmon generator 36 in the surface plasmon mode.

Actually, from the optical interfacial state between the waveguide 35, which is a core, and the buffer portion 50, evanescent light is excited in the buffer portion 50. Next, the surface plasmon is excited by coupling the evanescent light and a fluctuation of charges excited on the metal surface (propagative edge 360) of the plasmon generator 36. More specifically, because the surface plasmon, which is the elementary excitation in this system, is coupled to the electromagnetic wave, a surface plasmon polariton is excited. The surface plasmon polariton is simply referred to as a surface plasmon hereinafter.

The propagative edge 360 is located at a position closest to the waveguide 35 on the inclined lower surface 362 of the plasmon generator 36 and has an angled part where the electric field is concentrated. Therefore, the surface plasmon can be easily excited. At this time, induction of the surface plasmon is achieved by forming the refractive index $n_{BF}$ for the buffer portion 50 to be smaller than the refractive index $n_{WG}$ of the waveguide 35 ($n_{BF} < n_{WG}$) and by appropriately selecting the length of the buffer portion 50 (in the X axis direction), that is, the length $L_{BF}$ of the coupled portion of the waveguide 35 and the plasmon generator 36, and the thickness $T_{BF}$ of the buffer portion 50 (in the Z axis direction). The induction of the surface plasmon mode is described in "Integrated Plasmon and Dielectric and Waveguides" by Michael Hochberg, Tom Baehr-Jones, Chris Walker and Axel Scherer, OPTICS EXPRESS Vol. 12, No. 22, pp. 5481-5486 (2004) and U.S. Patent Publication No. 2005/0249451 A1.

Figure 11:
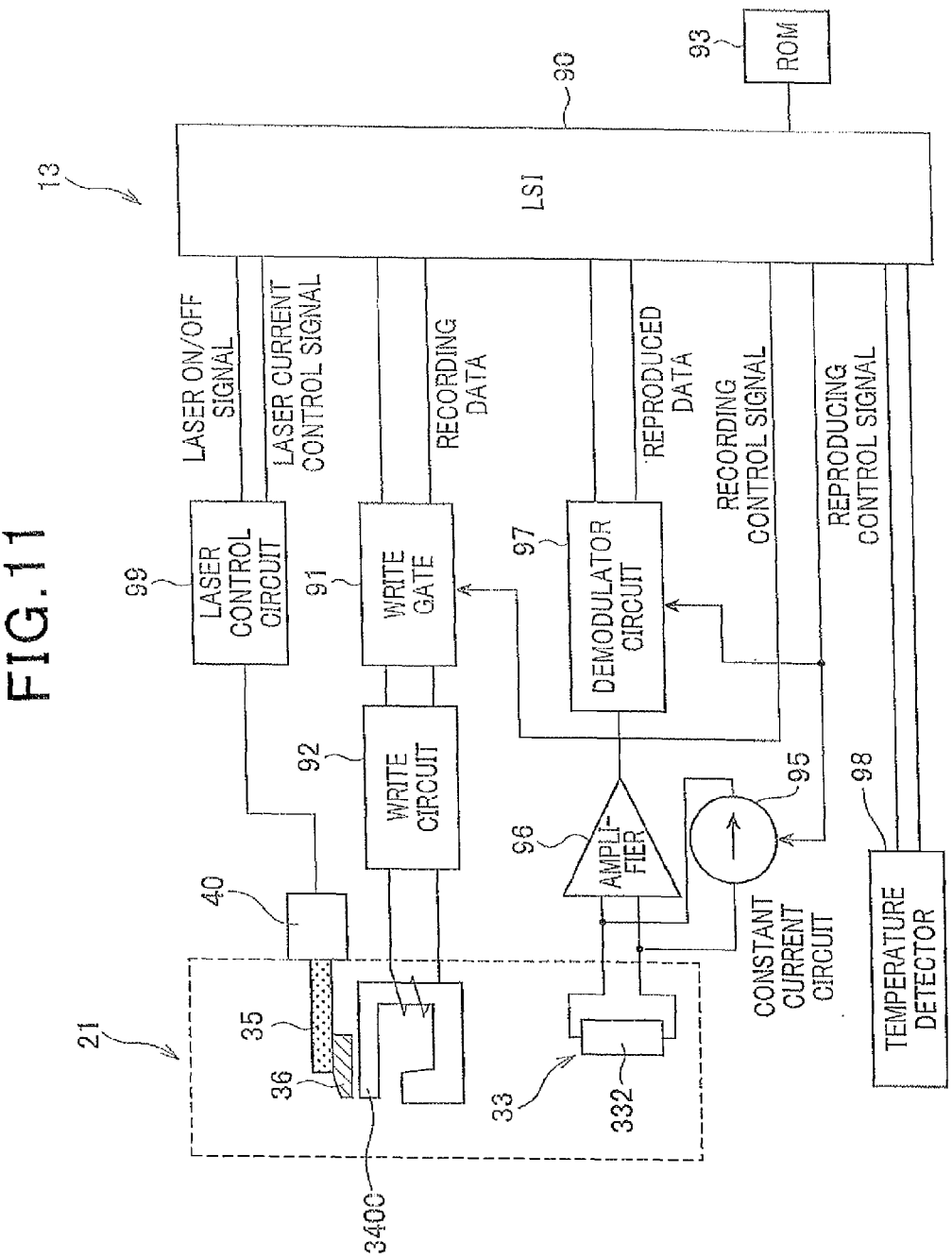
FIG. 11 is a block diagram that illustrates a circuitry of a recording/reproducing and light emission control circuit of the magnetic disk device shown in FIG. 5.

In the excited surface plasmon mode, the surface plasmon 60 is excited on the propagative edge 360 of the plasmon generator 36 and is propagated on the propagative edge 360 along the direction of arrow 61. The propagation of the surface plasmon 60 is possible under a condition that the propagative edge 360 of the plasmon generator 36 is covered by a material having a refractive index $n_{IN1}$ that is the same as or higher than the refractive index $n_{IN2}$ of a material that covers the end surface 361 on the opposite side of the propagative edge 360. Actually, it is known that the refractive index $n_{IN1}$ is preferably equal to or greater than the refractive index $n_{IN2}$ multiplied by 1.5 (refractive index $n_{IN1} \geq$ refractive index $n_{IN2} \times 1.5$). In FIG. 11, the refractive index $n_{IN2}$ of the thermal conductive layer 51 is set lower than the refractive index $n_{IN1}$ of the insulating layer 52 that covers the propagative edge 360 of the near-field light generation layer 36.

As the surface plasmon 60 is propagated, the surface plasmon 60, that is, the electric field, is concentrated on the near-field generating end surface 36a that includes the vertex 360a, which extends to the head part end surface 2210 and which is the destination of the propagative edge 360.

As a result, a near-field light 62 is generated from the near-field generating end surface 36a. The near-field light 62 is emitted towards the magnetic recording layer of the magnetic disk 10. The near-field light 62 reaches the surface of the magnetic disk 10 and heats up the magnetic recording layer part of the magnetic disk 10. As a result, an anisotropic magnetic field (coercive force) of that part decreases to a value at which the writing of data can be performed. Immediately after that, a writing magnetic field 63 generated from the main magnetic pole 3400 is applied to that part to perform the writing. This accomplishes the thermally-assisted magnetic recording.

As described above, by adjusting the shape and size of the near-field generating end surface 36a on the head part end surface 2210, the emitting point of the near-field light 62 on the near-field generating end surface 36a can be arranged at a position on the trailing side (the bottom edge 361a side) that is closer to the first main magnetic pole part 3400a. Therefore, the writing magnetic field having a sufficiently large gradient can be applied to the part of the magnetic recording layer of the magnetic disk 10 that has been sufficiently heated. As a result, a stable writing operation with thermal assistance can be reliably performed.

Furthermore, in the above-described plasmon generator 36, the propagative edge 360 on which the surface plasmon propagates forms a propagative region having an extremely narrow width in the track width direction. In addition, in the present embodiment, the plasmon generator 36 has a triangular cross-section in the YZ plane. In particular, the plasmon generator 36 has a predetermined triangle shape in the vicinity of the head part end surface 2210. Therefore, it is possible that, on the head part end surface 2210 after polishing during head fabrication, the near-field generating end surface 36a, which appears on the polished surface, is formed in a desired shape (a triangular shape in the present embodiment). In addition, the size of the near-field generating end surface 36a is made extremely small, and the propagation of the surface plasmon thereon is assured.

Moreover, in the above-described thermally-assisted magnetic recording using the surface plasmon mode, the optical power efficiency at the plasmon generator 36 is around 20%, for example, which is a significant increase from approximately 5-10% or less as in an example of reports using a conventional plasmon generator.

As a result, a protrusion of the near-field generating end surface 36a in the direction towards the magnetic disk 10 is suppressed without excessively increasing the temperature of the plasmon generator 36.

Further, in the conventional configuration in which the laser light that propagates through the waveguide is directly irradiated onto the plasmon generator provided at a position of the head end surface, a large amount of the irradiated laser light is converted to thermal energy in the plasmon generator. On the other hand, the size of such a plasmon generator is set to be less than the wavelength of the laser light. Therefore, the volume is extremely small. Accordingly, the plasmon generator reaches a high temperature, such as 500° C., due to the thermal energy. In contrast, in the thermally-assisted magnetic recording in the present embodiment, the surface plasmon is used, and the near-field light 62 is generated by propagating the surface plasmon 60 towards the head part end surface 2210.

Accordingly, the temperature of the near-field generating end surface 36a at the time of generating the near-field light significantly decreases to approximately 100° C., for example. As a result, a protrusion of the near-field generating end surface 36a in the direction towards the magnetic disk 10 is suppressed, and thereby excellent thermally-assisted magnetic recording can be accomplished.

Figure 12:
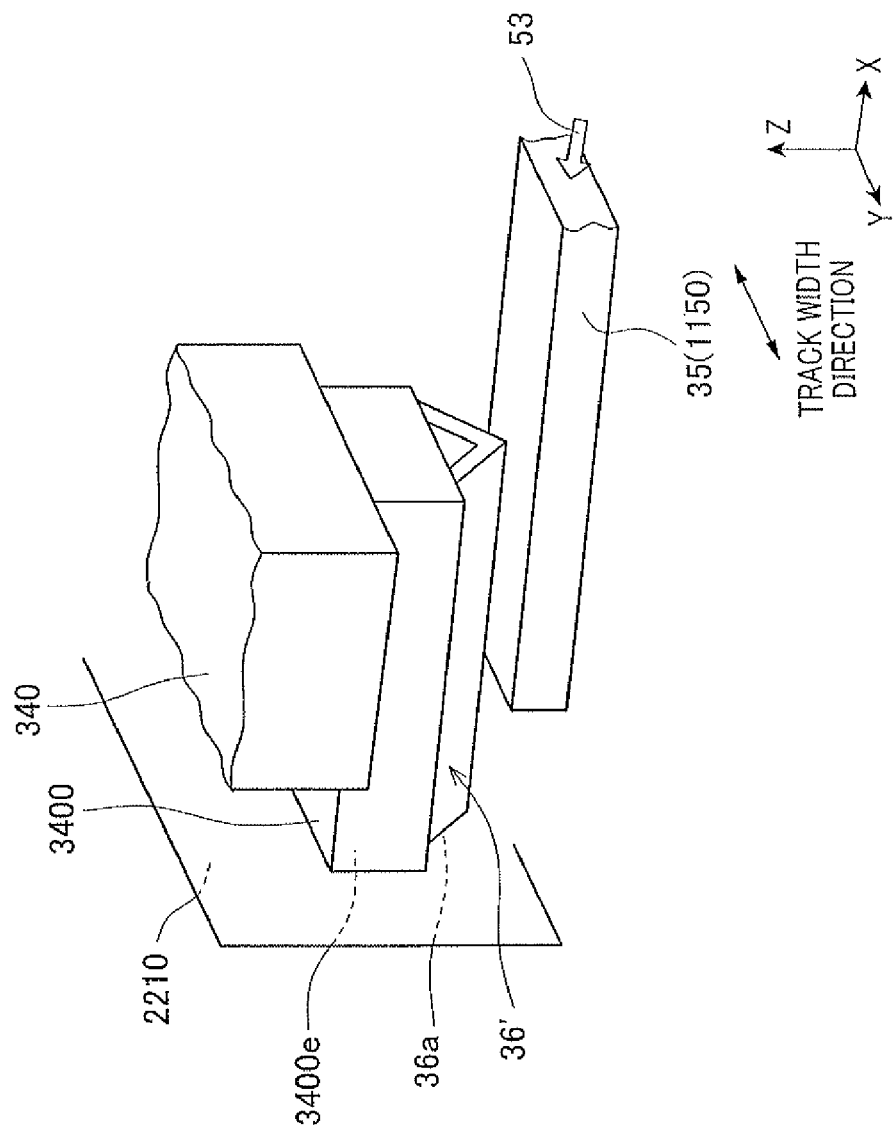
FIG. 12 corresponds to FIG. 8 with a plasmon generator of another form and is a perspective view that schematically illustrates a configuration including the waveguide, the plasmon generator and the main magnetic pole layer.
Figure 13:
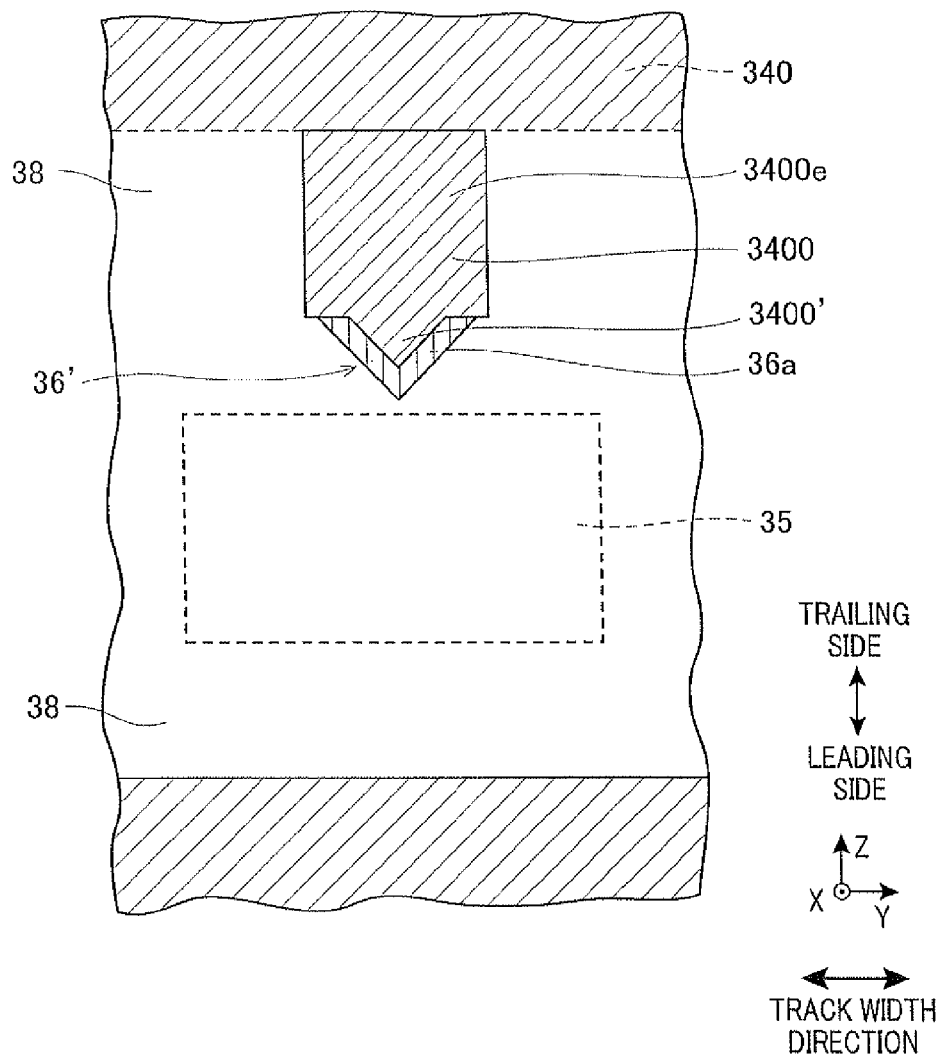
FIG. 13 corresponds to FIG. 9 with a plasmon generator of another form and is a plan view that illustrates shapes of end surfaces of the plasmon generator and the electromagnetic conversion element on the head part end surface.

The configuration of the plasmon generator 36 as shown in FIGS. 8-10 may be modified to that of a plasmon generator 36' as shown in FIGS. 12 and 13.

The plasmon generator 36' shown in FIGS. 12 and 13 has a configuration with a V-shaped cross-section on the ABS-side end surface 36a and the same configuration extends in the X direction. In this case, the lower part of the main magnetic pole 3400 has a configuration in which the protrusion 3400' with a V-shaped cross-section extends in the −Z direction. The plasmon generator 36' with the V-shaped cross-section fits on the protrusion 3400' with the V-shaped cross-section. The V-shaped front end of the plasmon generator 36' becomes the propagative edge, at which the surface plasmon is induced. That is, the laser light in the waveguide 35 that has advanced to the vicinity of the buffer portion is coupled with the optical structure between the buffer portion and the plasmon generator 36' to cause the surface plasmon mode to be induced on the propagative edge of the plasmon generator 36'. With the induced surface plasmon mode, a surface plasmon is excited on the propagative edge of the plasmon generator 36' and propagates on the propagative edge in the ABS direction (−X direction). Thereby the near-field light is generated from the ABS end surface of the propagative edge towards the magnetic recording medium.

With such configurations, a near-field light emission element, on which the emitting point is controlled, can be placed near the magnetic pole, and therefore, the distance between the writing magnetic pole and the near-field light emission element can be reduced.

The configuration of the plasmon generator 36' is not limited to the configuration shown in FIGS. 12 and 13. As an example modification, the plasmon generator may include wings provided on both sides (+Y and −Y directions) on the upper end parts of the V-shaped cross-section. The plasmon generator may also have a configuration in which the part of the plasmon generator near the ABS end surface has a V-shaped cross-section and the plasmon generator expands in a boat shape towards the deeper side (X direction). The magnetic pole may be formed to include a protrusion that also fits in the concave part of the plasmon generator in these example modifications.

FIG. 11 is a block diagram that illustrates a circuitry of the recording/reproducing and light emission control circuit of the magnetic disk device shown in FIG. 5.

In FIG. 11, reference 90 indicates a controller large-scale integration circuit (LSI). Reference 91 indicates a write gate that receives recording data from the controller LSI 90. Reference 92 indicates a write circuit. Reference 93 indicates a read-only memory (ROM) that stores a control table and the like for the values of operating current supplied to the laser diode 40. Reference 95 indicates a constant current circuit that supplies sense current to the MR effect element 33. Reference 96 indicates an amplifier that amplifies output voltage of the MR current element 33. Reference 97 indicates a demodulation circuit that outputs reproduction data to the controller LSI 90. Reference 98 indicates a temperature detector. Reference 99 indicates a control circuit for the laser diode 40.

The recording data outputted from the controller LSI 90 is supplied to the write gate 91. The write gate 91 supplies the recording data to the write circuit 92 only when the recording control signal outputted from the controller LSI 90 indicates an instruction for the writing operation. The write circuit 92 passes writing current to the writing coil layer 343 based on the recording data to perform the writing on the magnetic disk by a writing magnetic field generated from the main magnetic pole 3400.

The constant current flows from the constant current circuit 95 to the MR multilayer body 332 only when the reproducing control signal outputted from the controller LSI 90 indicates an instruction for the reading operation. The signal reproduced by the MR effect element 33 demodulated by the demodulation circuit 97 after being amplified by the amplifier 96. The obtained reproduction data is outputted to the control LSI 90.

The laser control circuit 99 receives a laser ON/OFF signal and an operating current control signal outputted from the control LSI 90. When the laser ON/OFF signal indicates an ON operation instruction, operating current having a value equal to or greater than an oscillation threshold value is applied to the laser diode 40. As a result, the laser diode 40 emits the laser light, which propagates through the waveguide 35 and is coupled with the plasmon generator 36 in the surface plasmon mode. Therefore, the near-field light is generated from the end of the plasmon generator 36 and is irradiated onto the magnetic recording layer of the magnetic disk, causing the magnetic recording layer to be heated. The value of the operating current at this time is controlled at a value based on the operating current value control signal. The controller LSI 90 generates the laser ON/OFF signal based on the timing of the recording/reproducing operation and determines the value of the operating current value control signal based on the control table in the ROM 93 in view of the temperature of the magnetic recording layer of the magnetic disk measured by the temperature detector 98 and the like. The control table may include not only the oscillation threshold value and temperature relativity between optical output and operating current characteristics but also data relating to relations between the operating current value and the amount of temperature increase in the magnetic recording layer affected by the thermal assistance and the temperature relativity between the magnetic recording layer and the anisotropic magnetic field (coercive force). By providing a system for the laser ON/OFF signal and the operating current value control signal, independent from the system for the recording/reproducing operation control signal, not only the simple current passage to the laser diode 40 in conjunction with the recording operation but also various current passage modes can be achieved.

It is apparent that the circuitry of the recording/reproducing and light emission control circuit 13 is not limited that that shown in FIG. 11. The writing operation and the reading operation may be specified by a signal other than the recording control signal or the reproducing control signal.

Figure 14:
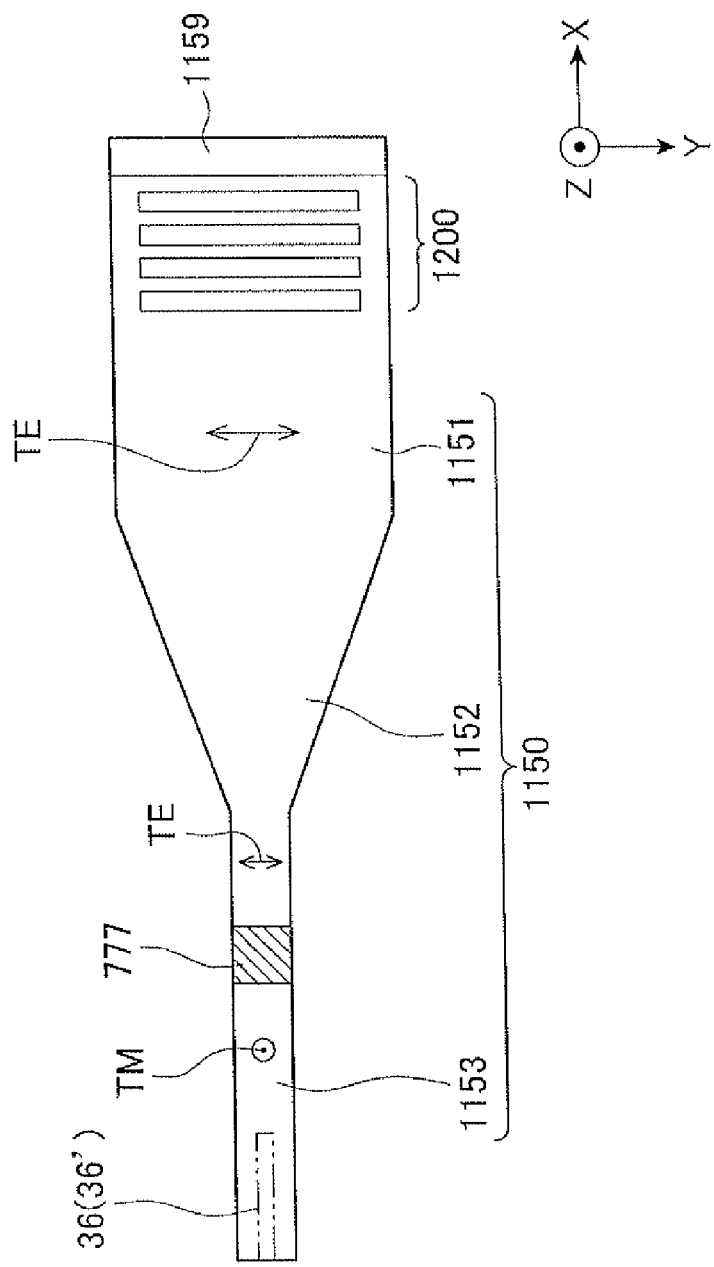
FIG. 14 corresponds to FIG. 2 and is a plan view that illustrates an example of a form of the core when the optical waveguide of the present invention is implemented in the thermally-assisted magnetic recording head.
Figure 15:
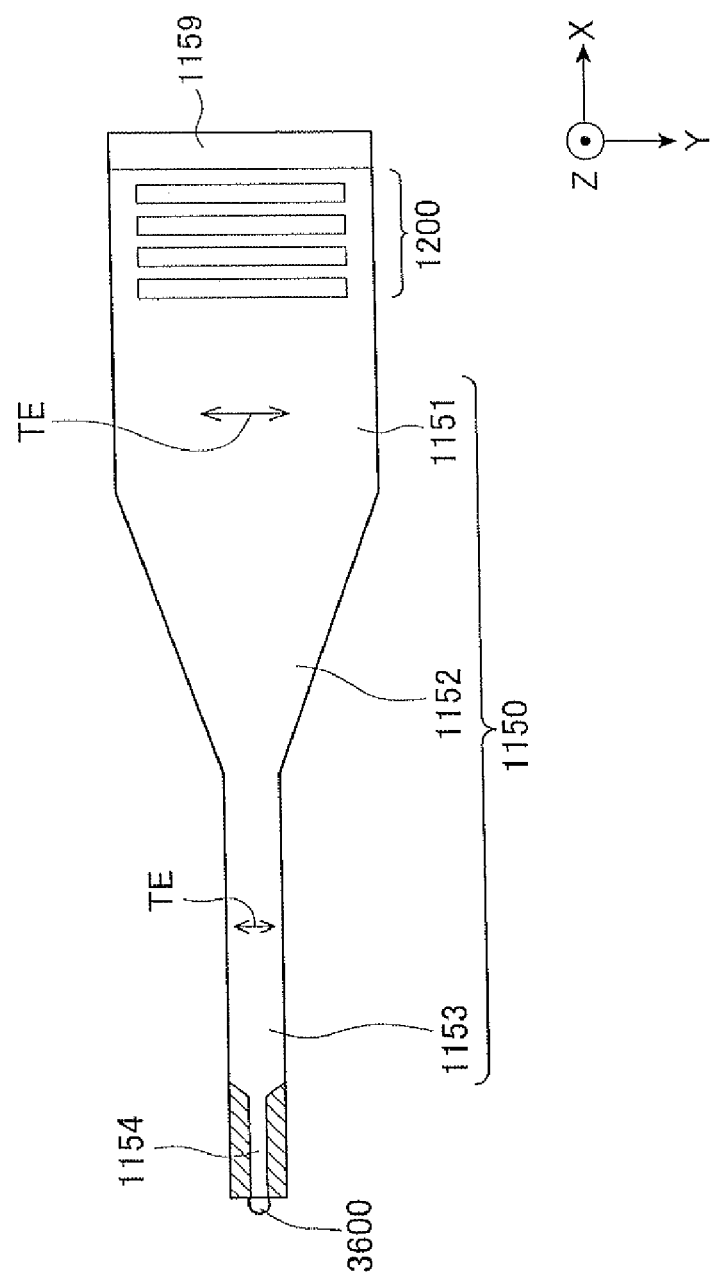
FIG. 15 corresponds to FIG. 2 and is a plan view that illustrates an example of a form of the core when the optical waveguide of the present invention is implemented in the thermally-assisted magnetic recording head.

While considering the above discussion, it is desirable that the configuration of the core 1150 is the same as the configuration shown in FIG. 14 or 15 if the optical waveguide of the present invention is adapted in a thermally-assisted magnetic recording head.

The core 1150 as shown in FIG. 14 is especially preferable in combination with the plasmon generator 36 or 36' that includes the above-described propagative edge. The core 1150 shown in FIG. 14 includes a TE-TM conversion element 777 at the narrow front end core part 1153. As a result, the laser light that propagates in the TE mode polarization (the oscillation direction being in the Y direction) through the core base part 1151 and the taper part 1152 is converted to the TM mode polarization (the oscillation direction being in the Z direction) to allow the laser light to be coupled with the plasmon generator 36 in the surface plasmon mode.

In addition, the core 1150 shown in FIG. 15 has a configuration in which a front end part 1154, at which the narrow front end core part 1153 is further tapered down, is provided, and a plasmon generator chip 3600 is directly attached to the tip of the front end part 1154. This is the simplest and most orthodox form to generate the near-field light. In this case, the laser light propagates in the TM mode polarization (oscillation direction in the Y direction) to the plasmon generator chip because it is not necessary to provide the plasmon coupling.

The above-described optical waveguide of the present invention is explained in further detail based on a specific example.

Experimental Example I

An experimental example is shown below, in which the optical intensity was analyzed in a simulation, as the optical intensity being an index for how much light that is irradiated to the grating 1200 is optically coupled with and propagates through the optical waveguide in the configuration shown in FIGS. 1-3.

The parameter used is a ratio of the depth H1 of the concave groove 1201 of the grating 1200 with respect to the thickness H2 of the core base part 1151 shown in FIG. 3 (H1/H2).
<Condition for Simulation>
Core material: TaOx (refractive index: 2.15)
Core size:
Wide core base part 1151 (width W1=4 µm; length L1=50 µm)
Taper part 1152 (length L2=100 µm)
Narrow front end core part 1153 (width W3=0.5 µm; length L3=30 µm)
Thickness (H2)=0.3 µm
Cladding material: $SiO_2$ (refractive index: 1.45)
Laser light used: wavelength 800 nm (converted wavelength in cladding), TM polarized wave
Specification of grating 1200
Single grating (grating length Wo (Y direction)=10 µm)
Grating pitch P=0.54 µm
Depth of concave groove 1201 of grating: H1 (parameter).
Cladding material is filled in the concave groove 1201.
Number of the concave grooves 1201: 20
Reflective film 1159: Au having a thickness of 100 nm provided on the end on the opposite side from the propagation direction of the core base part.

The results of analysis using the simulation are shown in Table 1 below. The location for measuring the optical intensity was between L2 and L1.

TABLE 1

| H1/H2 (%) | Optical Intensity $(V/m)^2$ |
|---|---|
| 1 | 251 |
| 17 | 605 |
| 33 | 2461 |
| 50 | 4833 |
| 67 | 3396 |
| 83 | 668 |
| 99 | 181 |
| 25% Protrusion | 243 |
| 50% Protrusion | 244 |

In Table 1, the 25% protrusion means a convex grating that protrudes by 25% of the core thickness on the basis of the core surface. The 50% protrusion means a convex grating that protrudes by 50% of the core thickness on the basis of the core surface.

The effect of the present invention is apparent from the above-described results. That is, the optical waveguide of the invention includes a core that is a waveguide through which light propagates; and a cladding that surrounds the core. The core has a plate shape and includes a wide core base part onto which the light is incident, a taper part that is connected to the core base part and of which a width is gradually tapered along a propagation direction, and a narrow front end core part that is connected to the taper part and that extends along the propagation direction. A grating is provided on one of planar surfaces of the wide core base part, the grating is formed by engraving a number of concave grooves having a rectangular cross section on the planar surface along a width direction thereof, the grating is formed to be optically coupled with laser light that is incident perpendicularly onto the grating formation surface, a frequency (grating pitch: pitch of the concave grooves) of the grating is smaller than a wavelength (defined as a wavelength in the cladding) of the perpendicularly incident laser light, and a groove depth H1 of the grating is formed with respect to a thickness H2 of the core base part so that a relationship H1=(0.33 to 0.67)×H2 is satisfied. Therefore, the laser light can be reliably optically coupled with the optical waveguide with the irradiation of the laser light in the direction perpendicular to the optical waveguide. As a result, the laser light generating device can be easily installed by simplifying the positional relationship between the optical wave guide and the laser light generating device.

What is claimed is:

1. A waveguide for a thermally-assisted magnetic head, comprising:
   a first section having a first width, the first section including a grating formed with a predetermined number of concave grooves along a light propagation direction of the waveguide, each concave groove extending in a width direction;
   a second section having a second width, the second width being less than the first width;
   a third section positioned between the first and second sections and having a third width that gradually changes from the first width to the second width in the light propagation direction, the first, second and third sections having substantially the same thickness; and
   a transverse electric-transverse magnetic (TE-TM) mode conversion element in the second section, wherein
   laser light is incident perpendicularly onto the first section and propagates in the light propagation direction to the second section through the third section,
   the concave grooves of the grating are provided at a predetermined pitch that is smaller than a wavelength of the perpendicularly incident laser light,
   the second width of the second section is configured to produce evanescent light based on the laser light that has propagated and advanced to the second section, and
   a groove depth H1 of the grating is formed with respect to a thickness H2 of the first section so that a relationship H1=(0.45 to 0.55)×H2 is satisfied.

2. The waveguide of claim 1, further comprising:
   a fourth section attached to the second section, the fourth having a fourth width that is smaller than the second width; and
   a plasmon generator chip attached to the fourth section, the plasmon generator chip generating near-field light.

3. A waveguide for a thermally-assisted magnetic head, comprising:
   a first section having a first width, the first section including a grating formed with a predetermined number of concave grooves along a light propagation direction of the waveguide, each concave groove extending in a width direction;
   a second section having a second width, the second width being less than the first width;
   a third section positioned between the first and second sections and having a third width that gradually changes from the first width to the second width in the light propagation direction, the first, second and third sections having substantially the same thickness; and a transverse electric-transverse magnetic (TE-TM) mode conversion element in the second section, wherein laser light is incident perpendicularly onto the first section and propagates in the light propagation direction to the second section through the third section, the concave grooves of the grating are provided at a predetermined pitch that is smaller than a wavelength of the perpendicularly incident laser light, and the second width of the second section is configured to produce evanescent light based on the laser light that has propagated and advanced to the second section.

* * * * *